(12) United States Patent
Isaksen et al.

(10) Patent No.: US 6,973,141 B1
(45) Date of Patent: Dec. 6, 2005

(54) FLEXIBLE MULTIMODE QAM MODULATOR

(75) Inventors: David Bruce Isaksen, Mountain View, CA (US); Byron Esten Danzer, Aptos, CA (US); Mark Fong, Cupertino, CA (US)

(73) Assignee: Wideband Semiconductors, Inc., Mountain View, CA (US)

( * ) Notice: Subject to any disclaimer, the term of this patent is extended or adjusted under 35 U.S.C. 154(b) by 729 days.

(21) Appl. No.: 09/972,180

(22) Filed: Oct. 4, 2001

(51) Int. Cl.[7] .............................................. H04L 27/20
(52) U.S. Cl. ...................... 375/308; 375/281; 375/293; 375/265; 375/261; 332/100; 332/103
(58) Field of Search ................................ 375/308, 281, 375/293, 265, 261; 322/100, 101; 332/100, 332/103

(56) References Cited

U.S. PATENT DOCUMENTS

| | | | | |
|---|---|---|---|---|
| 3,943,448 A | * | 3/1976 | Motley et al. | 375/293 |
| 5,945,885 A | * | 8/1999 | Schwartz et al. | 332/100 |
| 5,987,071 A | | 11/1999 | Iwamatsu et al. | 375/298 |
| 6,141,387 A | | 10/2000 | Zhang | 375/261 |
| 6,157,679 A | * | 12/2000 | Johnson | 375/281 |
| 6,233,712 B1 | | 5/2001 | Rhee et al. | 714/789 |
| 6,621,366 B1 | * | 9/2003 | Gentile | 332/103 |
| 2002/0181602 A1 | * | 12/2002 | Reddy | 375/261 |
| 2003/0067992 A1 | * | 4/2003 | Karaoguz et al. | 375/265 |

* cited by examiner

*Primary Examiner*—Shuwang Liu
*Assistant Examiner*—Eva Zheng
(74) *Attorney, Agent, or Firm*—Boris G. Tankhilevich

(57) ABSTRACT

A method of baseband/passband digital modulation for a data transmission system wherein a plurality of data symbols is transmitted over a transmission channel at a symbol rate. The method comprises the following steps: (1) generating a plurality of I and Q components of symbols by mapping an input bit stream comprising a plurality of digital codewords into a QAM constellation; (2) selecting a passband or a baseband mode; and (3) generating an analog output signal in the passband or baseband mode. The step of selecting the passband or the baseband mode depends on the complexity of QAM constellation. If QAM constellation includes less than 64 QAM plant points, the passband mode is selected, and if QAM constellation includes more than 64 QAM plant points, the baseband mode is selected. If the QAM constellation includes less than 64 QAM plant points, initially selecting the passband mode until a D/A conversion speed reaches a maximum passband conversion speed, and until an output symbol rate reaches a maximum passband symbol output rate, and subsequently switching to the baseband mode in order to double the maximum passband conversion speed and to double the maximum passband symbol output rate.

29 Claims, 15 Drawing Sheets

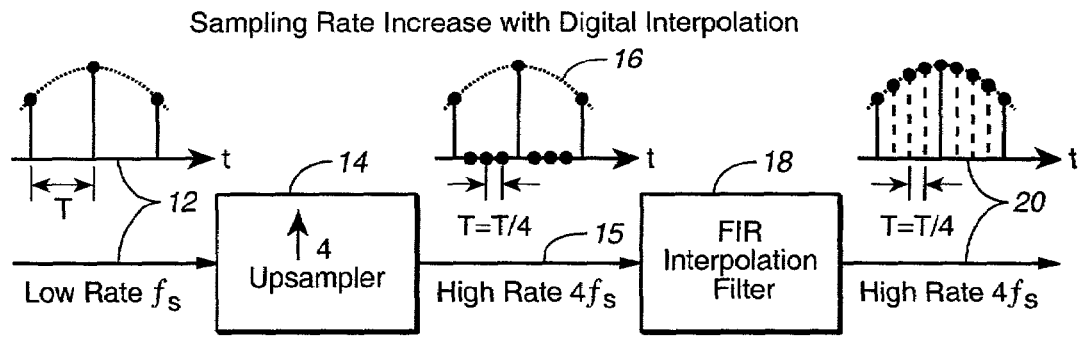
FIG._1 (PRIOR ART)
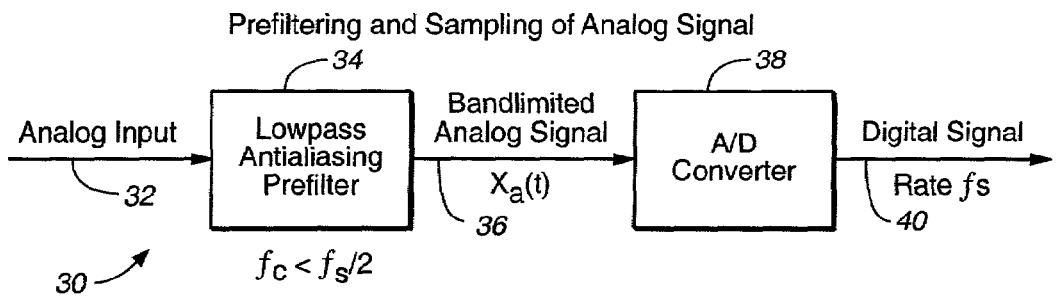
FIG._2 (PRIOR ART)
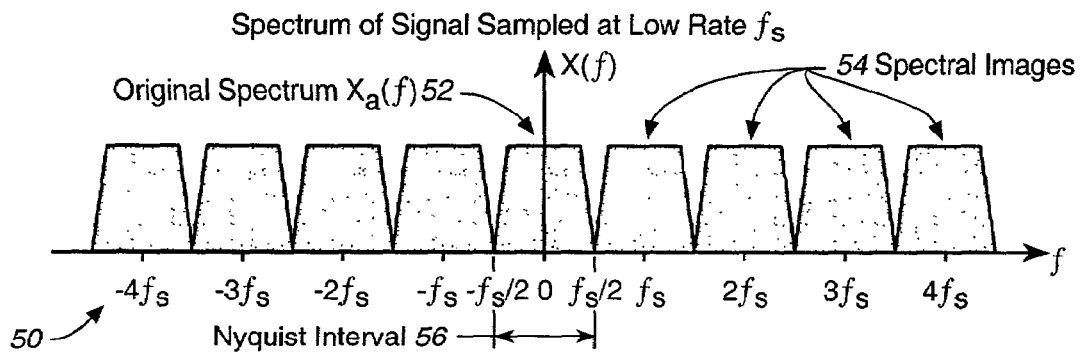
FIG._3 (PRIOR ART)
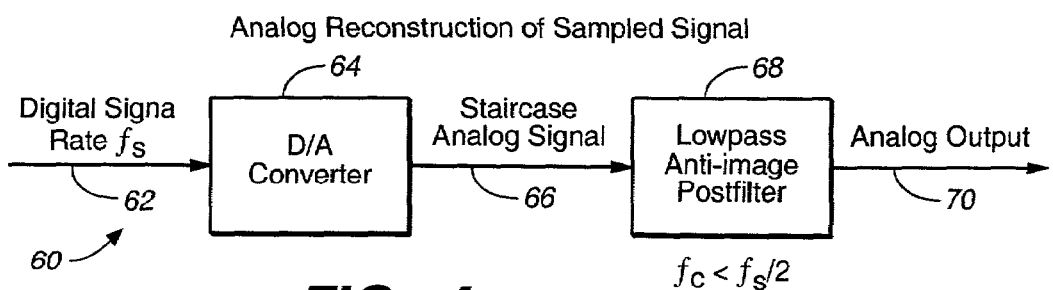
FIG._4 (PRIOR ART)

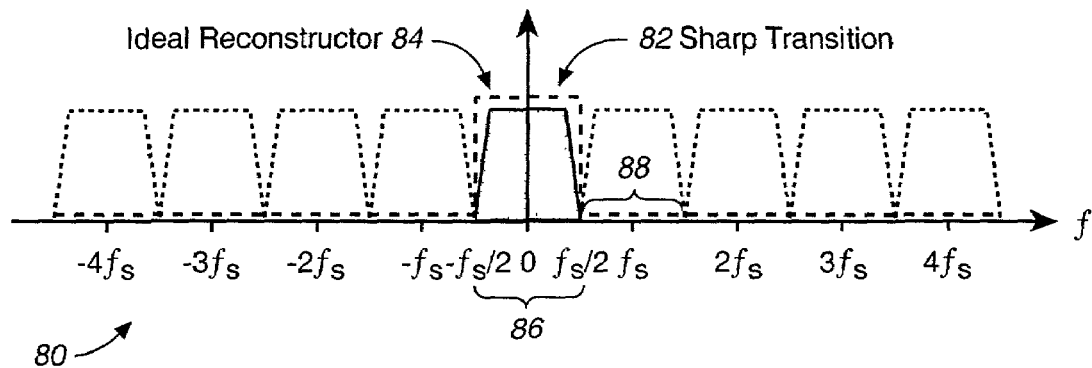
FIG._5 *(PRIOR ART)*
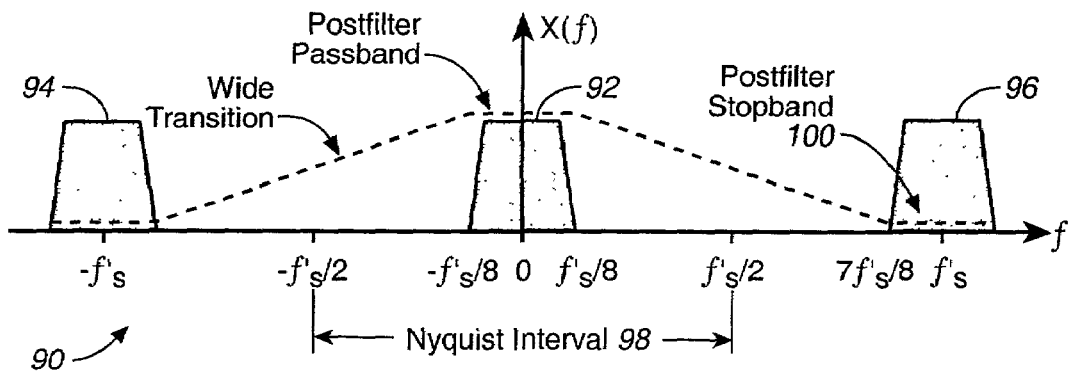
FIG._6 *(PRIOR ART)*
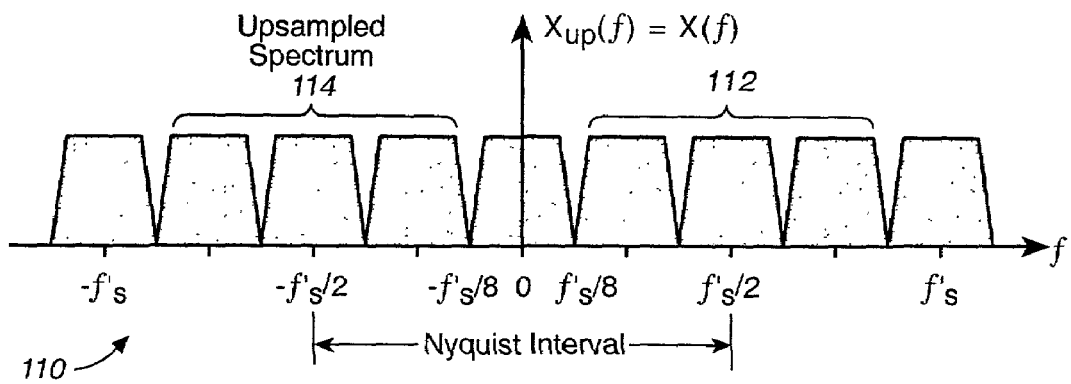
FIG._7 *(PRIOR ART)*

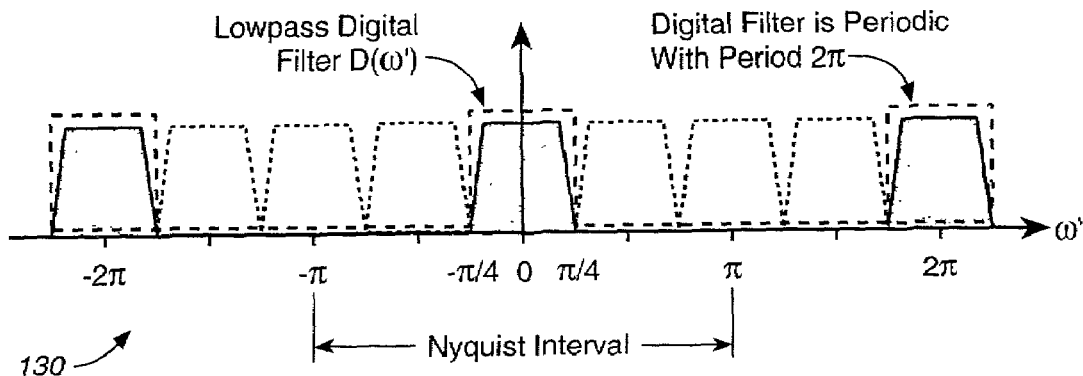
FIG._8A *(PRIOR ART)*
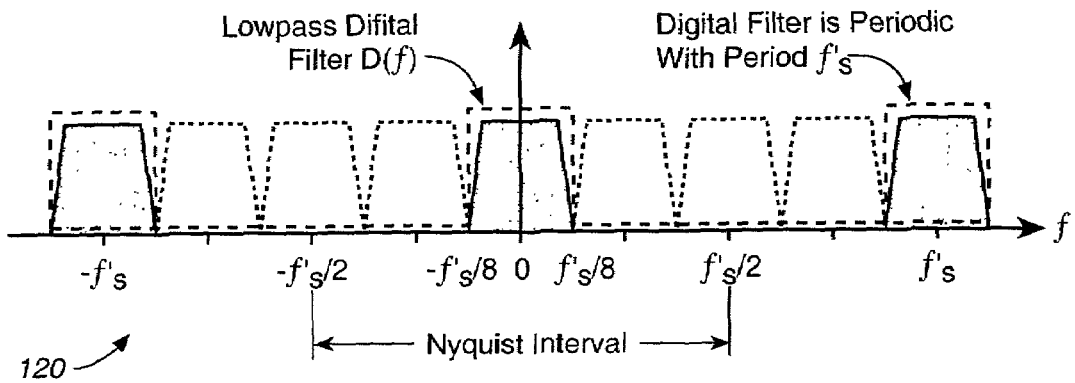
FIG._8B *(PRIOR ART)*
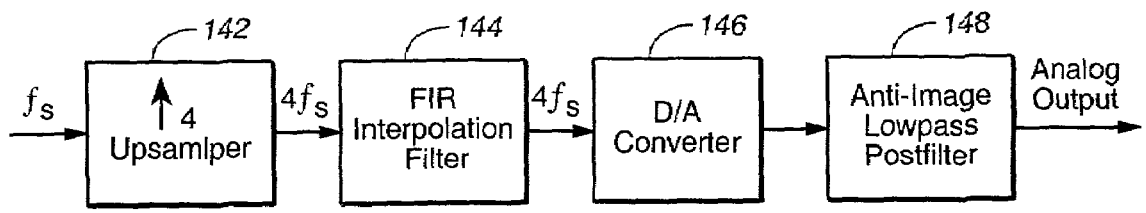
FIG._9 *(PRIOR ART)*

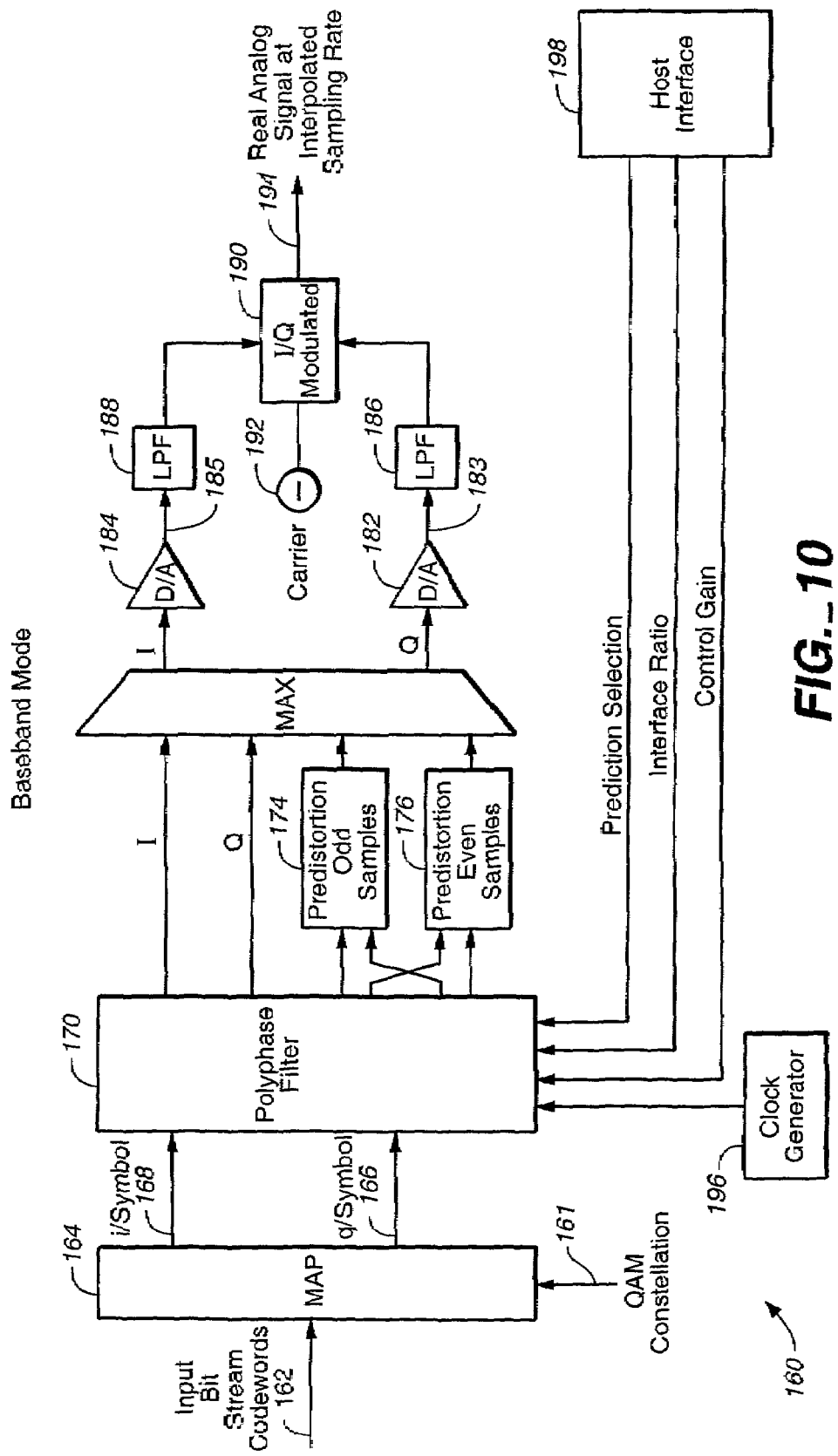
FIG._10

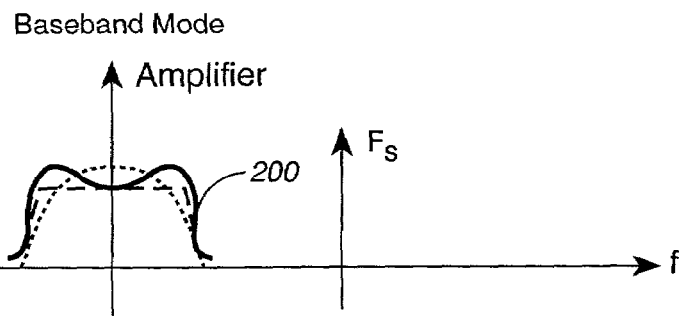
FIG._11A
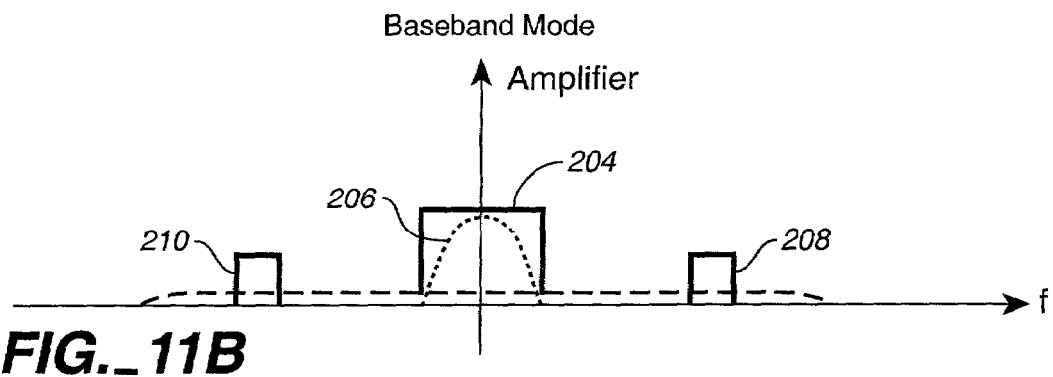
FIG._11B
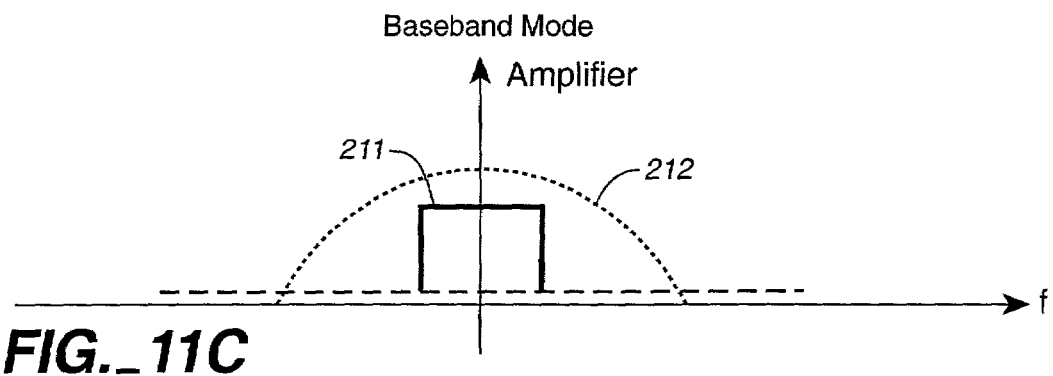
FIG._11C
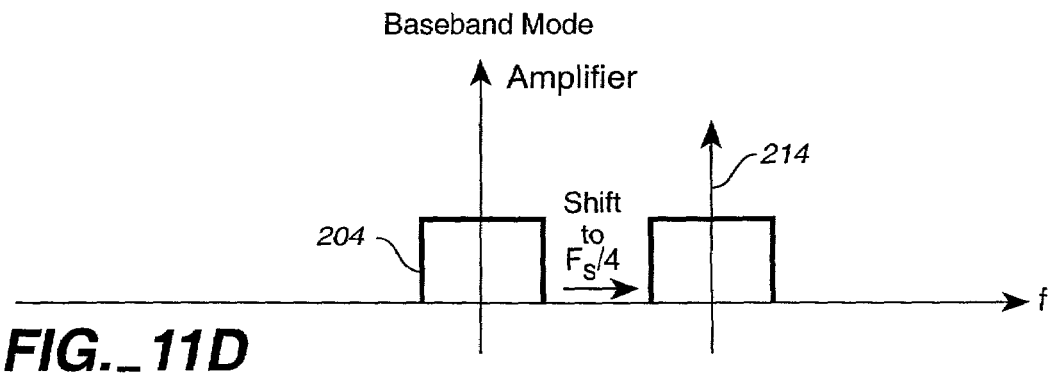
FIG._11D

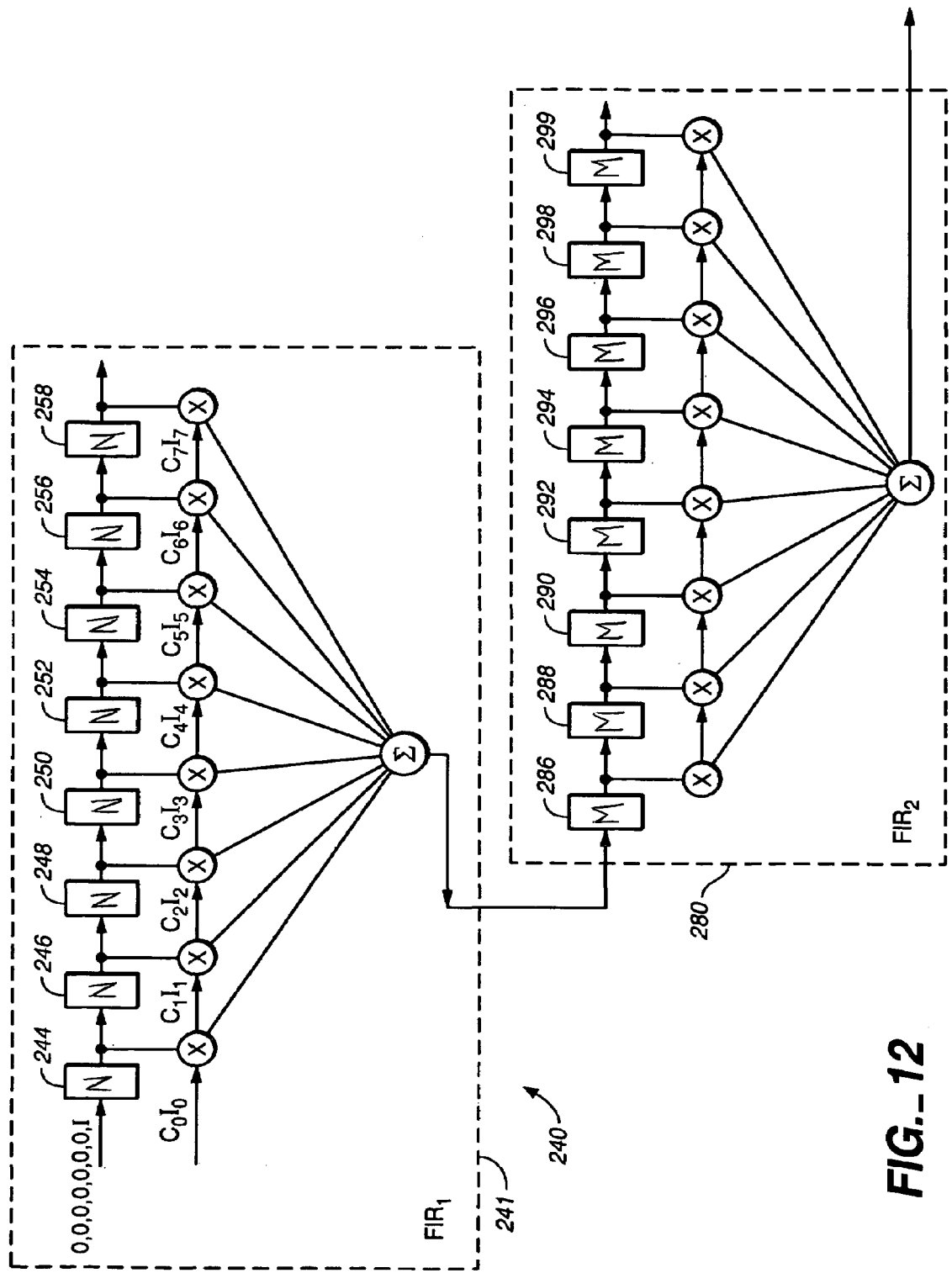
FIG._12

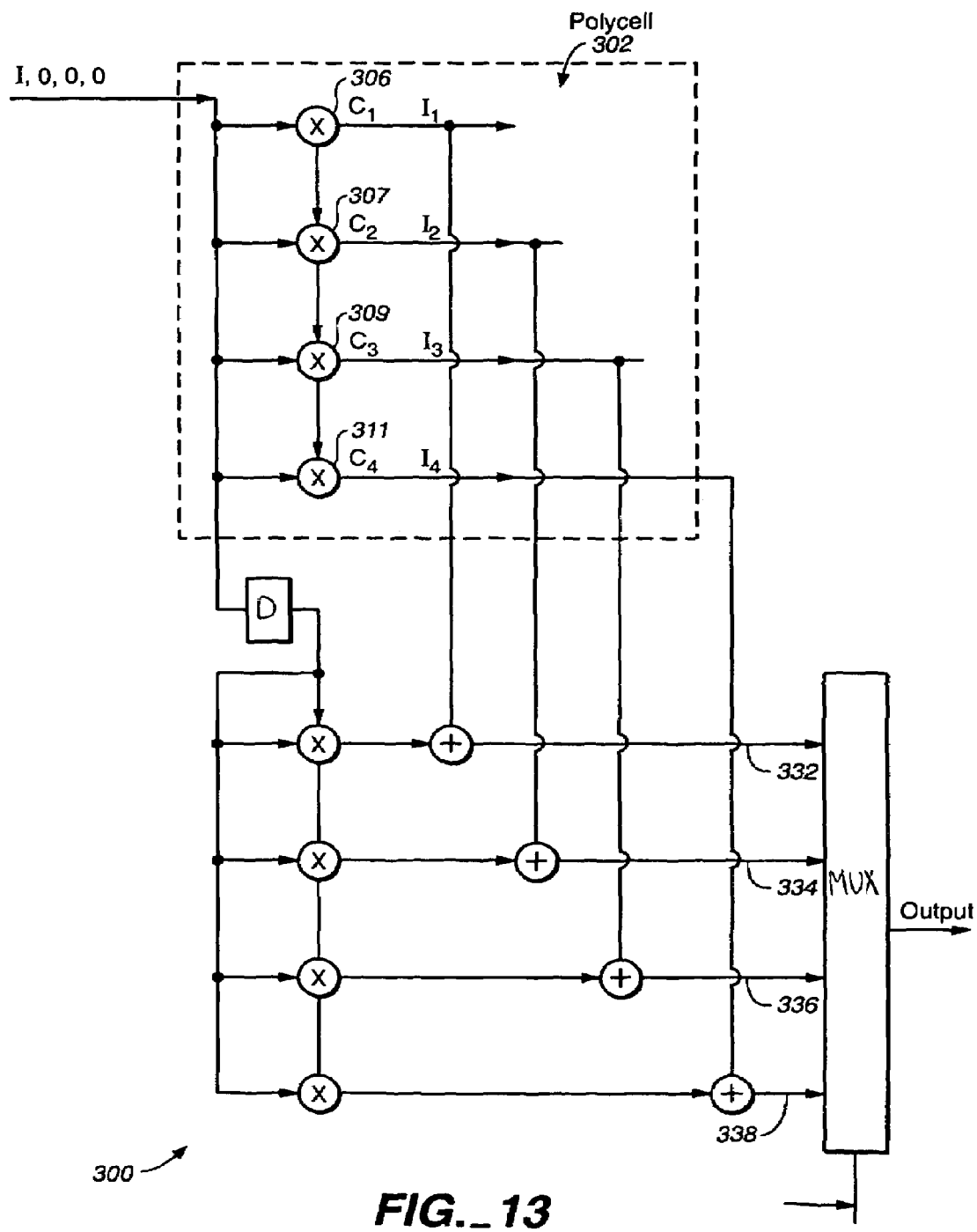
FIG._13

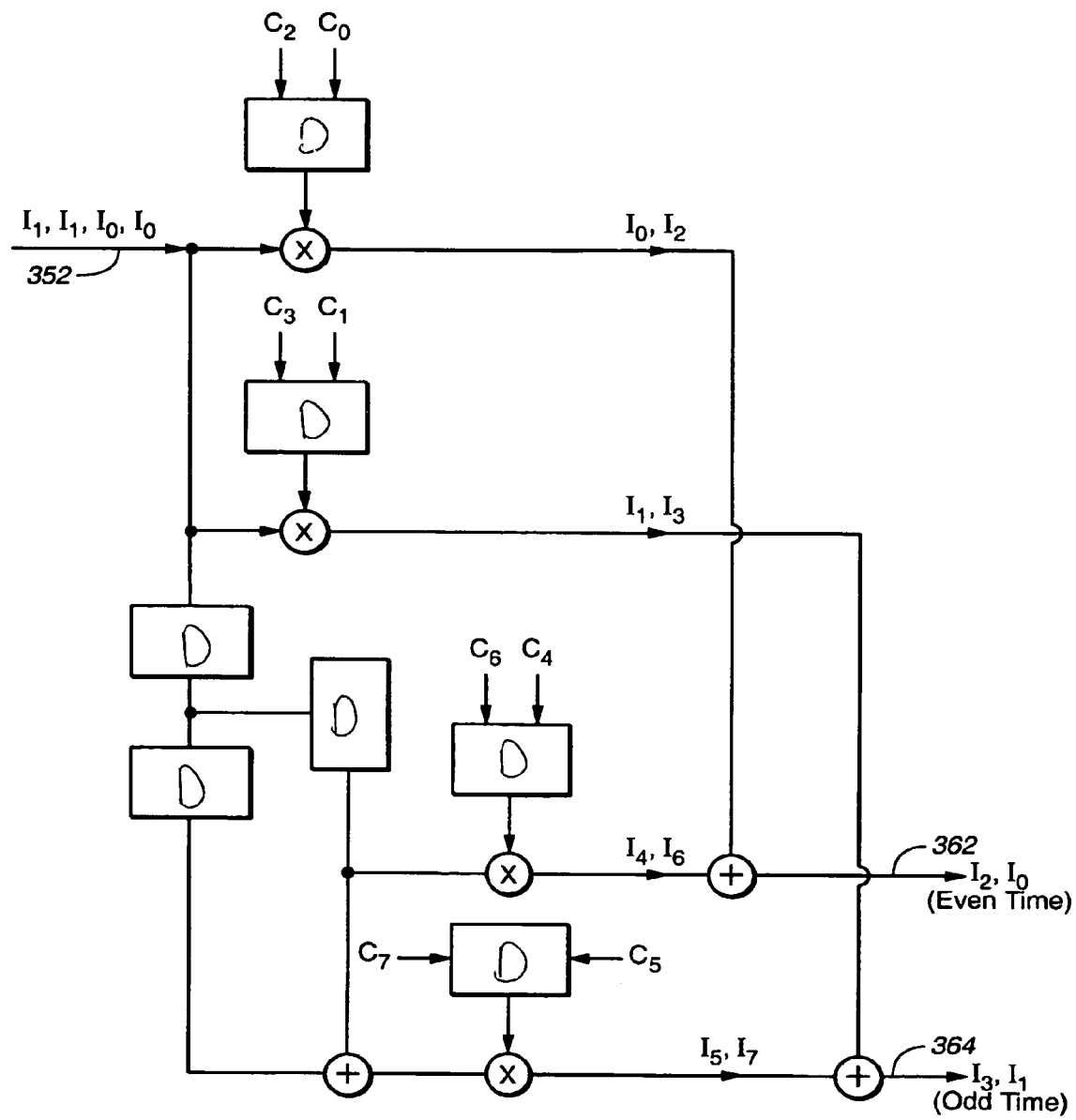
FIG._14

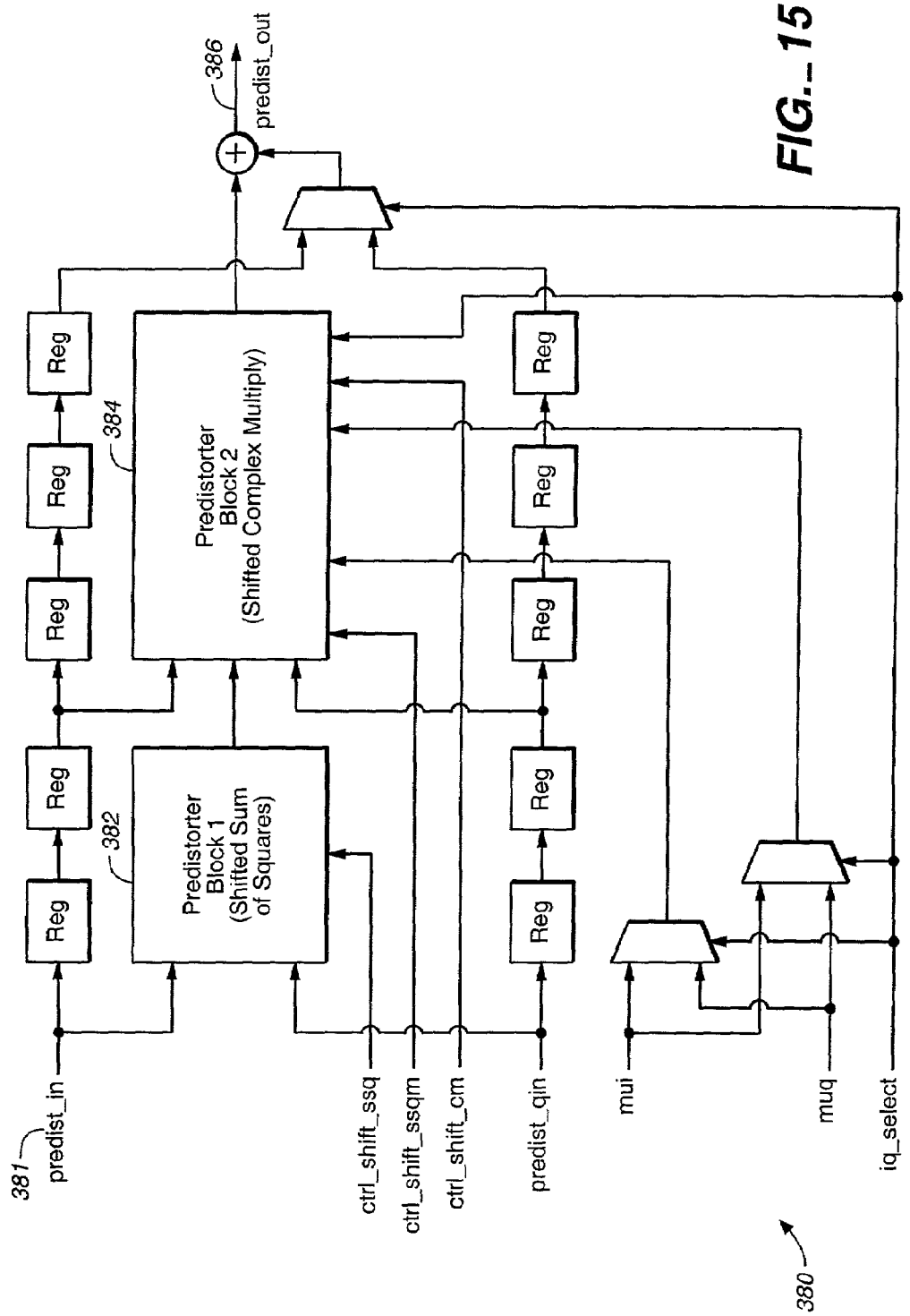
FIG._15

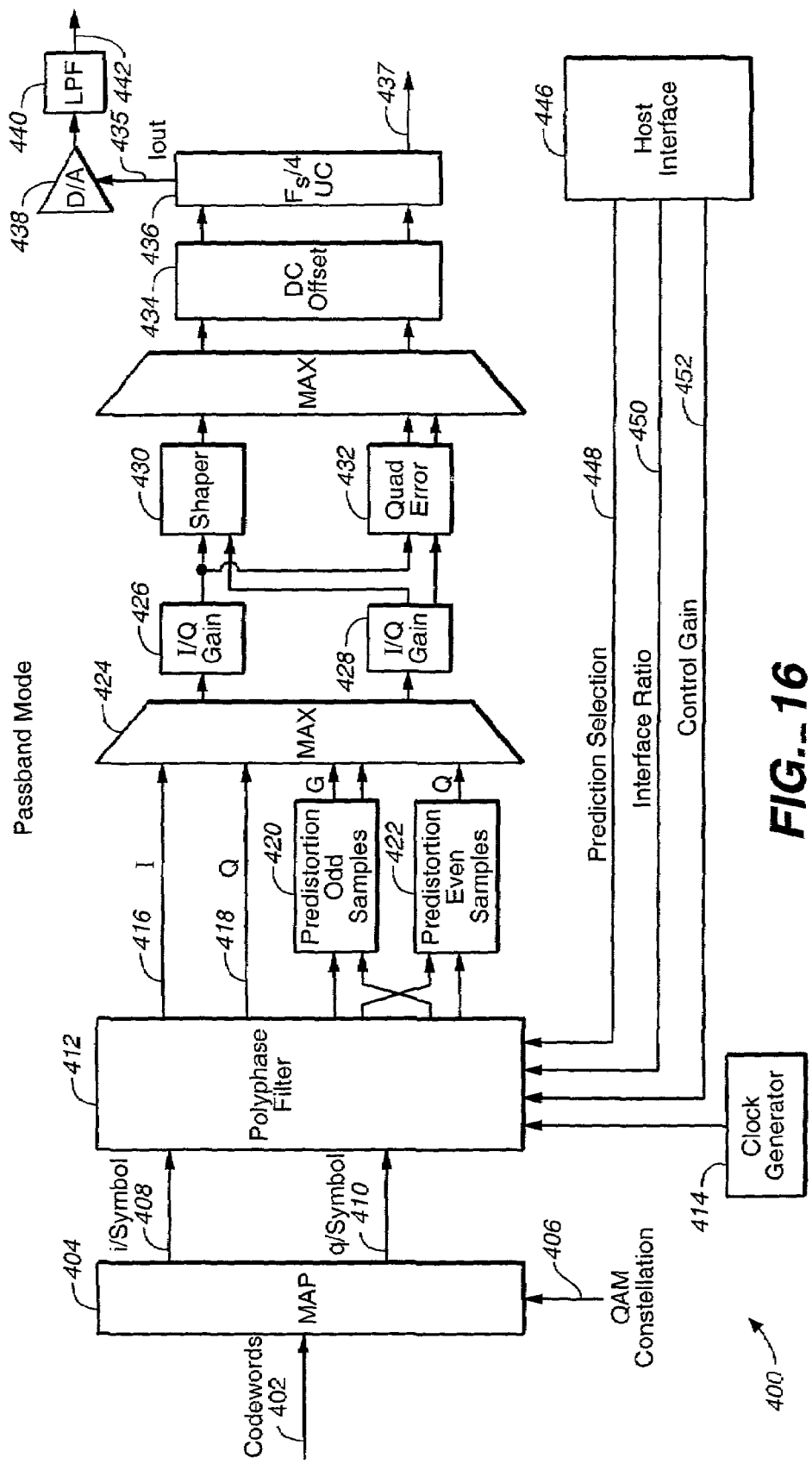
FIG._16

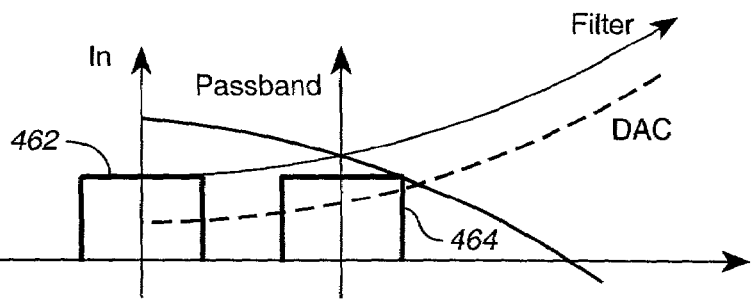
FIG._19A
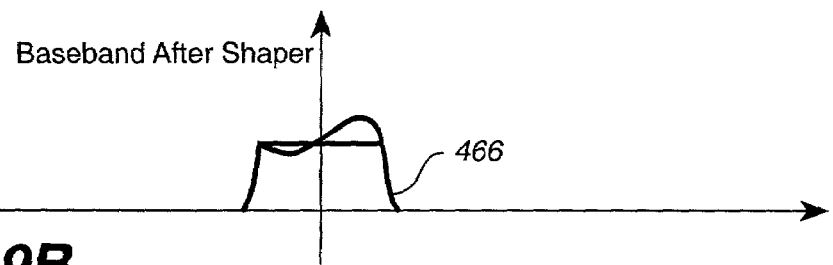
FIG._19B
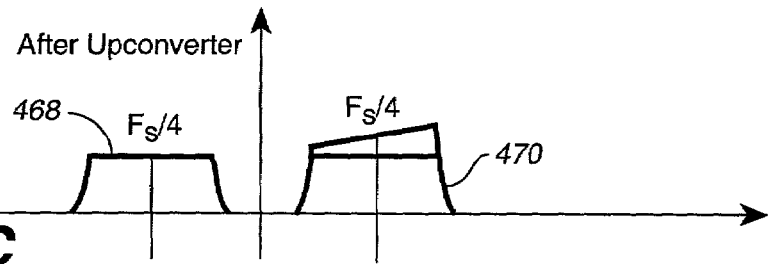
FIG._19C
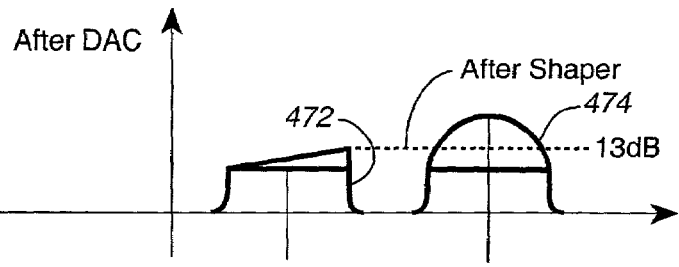
FIG._19D
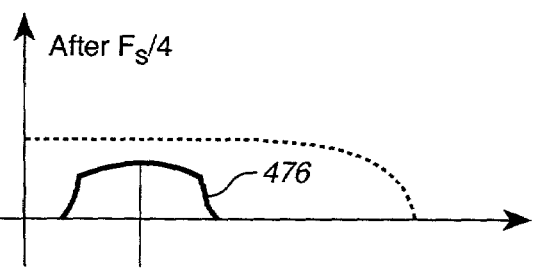
FIG._19E

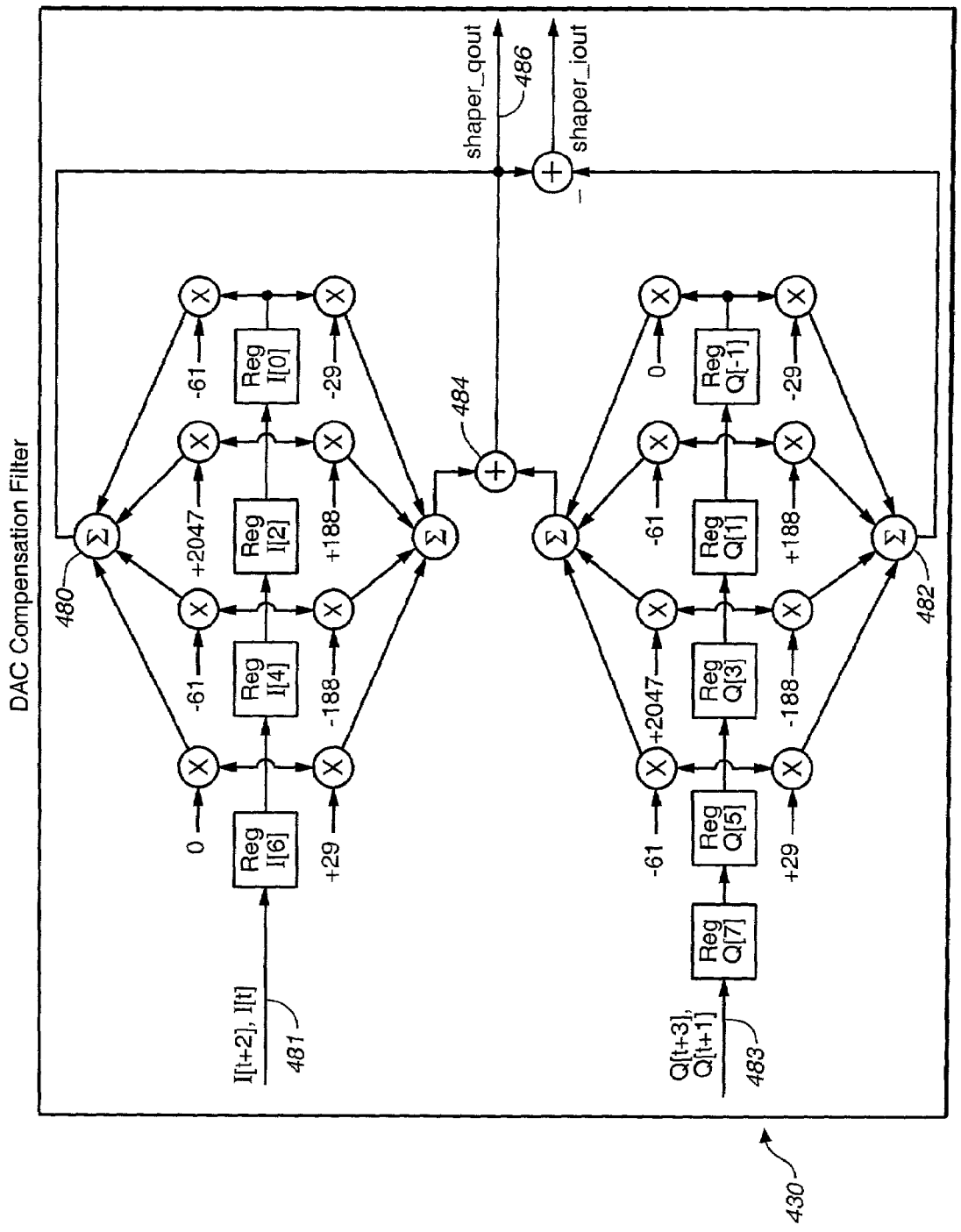
FIG._20

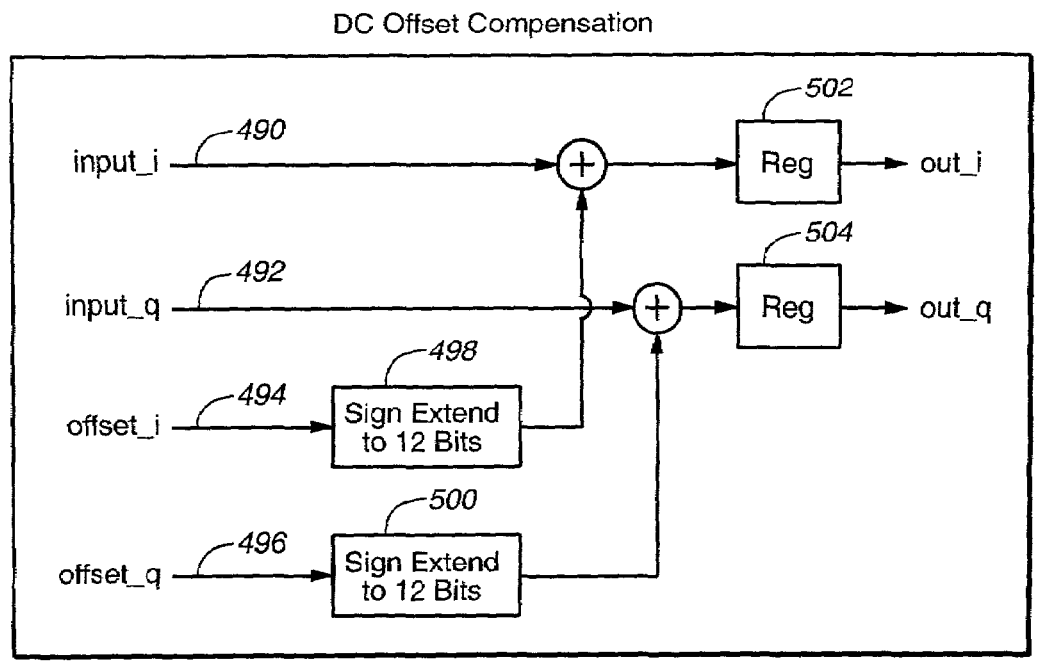
FIG._21
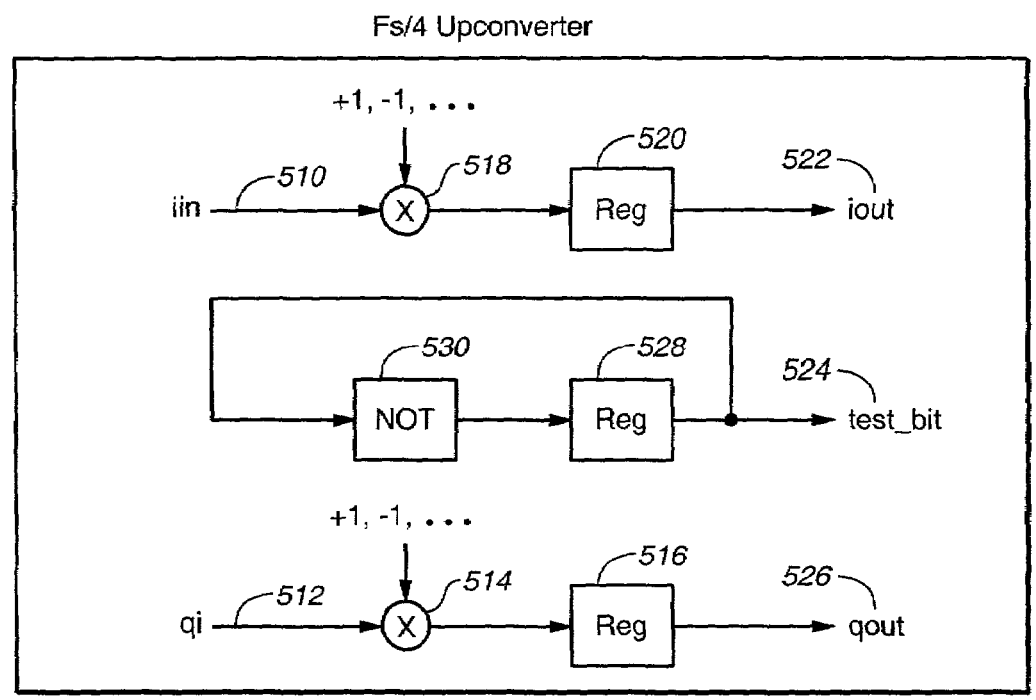
FIG._22

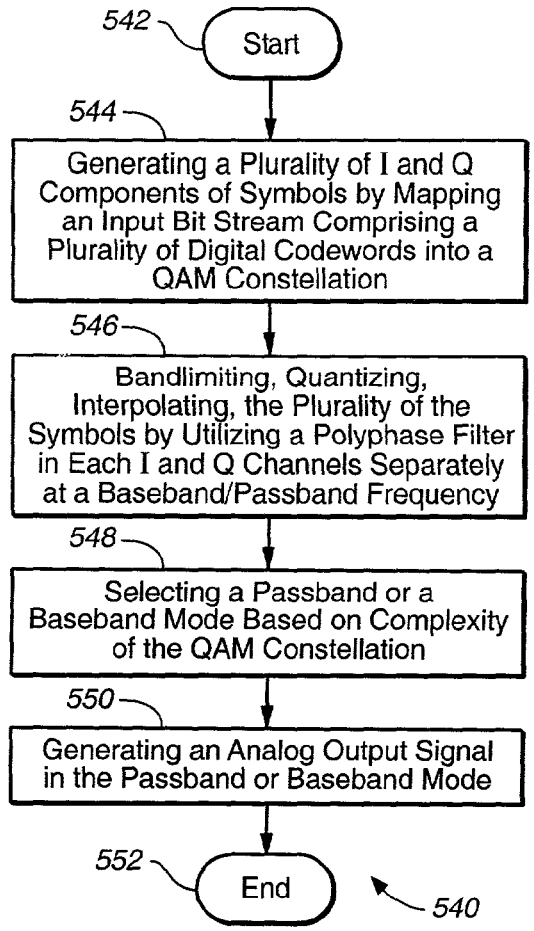
FIG._23
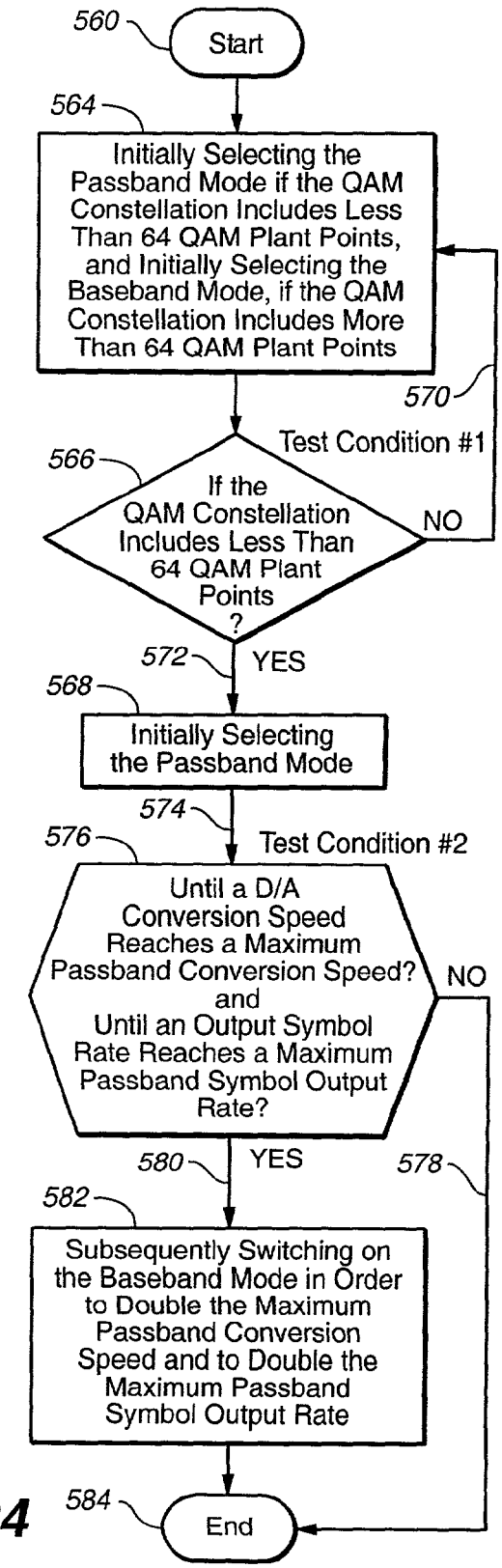
FIG._24

FLEXIBLE MULTIMODE QAM MODULATOR

BACKGROUND OF THE INVENTION

1. Field of the Invention

The present invention relates to a filed of digital signal processing, and more specifically, to a field of multimode digital modulators.

2. Discussion of the Prior Art

A major problem with the prior art digital QAM modulators is that they lack the capability to work in different modes including a passband mode and a baseband mode. Indeed, in a prior art passband mode of operation, a digital QAM modulator processes a plurality of data symbols transmitted over a transmission channel at a symbol rate and outputs a real analog signal comprising a complex combination of inphase I and quadrature Q components of the analog signal. This mode of operation is preferable if the QAM constellation includes less than 64 QAM plant points. On the other hand, in the baseband mode of operation, a prior art digital QAM modulator processes a plurality of data symbols transmitted over a transmission channel at a symbol rate and outputs only an inphase I component of the analog RF signal. The baseband mode of operation is preferable if the QAM constellation includes more than 64 QAM plant points.

What is needed is a QAM digital modulator that has the capability to dynamically switch from the passband mode to the baseband mode and vice versa depending on the dynamically changing nature of the input signal.

SUMMARY OF THE INVENTION

To address the shortcomings of the available art, the present invention provides a QAM digital modulator that has the capability to dynamically switch from the passband mode to the baseband mode.

One aspect of the present invention is directed to a method of baseband digital modulation for a data transmission system wherein a plurality of data symbols is transmitted over a transmission channel at a symbol rate. In one embodiment, the method of baseband digital modulation comprises the following steps: (1) generating a plurality of inphase (I) and the quadrature (Q) components of symbols by mapping an input bit stream comprising a plurality of digital codewords into a QAM constellation; (2) bandlimiting, quantizing, interpolating, and pre-compensating I and Q components of the symbols for a sync (sin x/x) function amplitude roll off by utilizing a Polyphase filter in each I and Q channels separately at a baseband frequency; (3) converting the plurality of digital symbols into an analog signal by using a D/A converter in each I and Q channels separately; (4) prefiltering by a lowpass analog antialiasing prefilter I and Q components of the analog signal in each I and Q channels separately; and (5) complexly combining I and Q components of the analog signal by an (I/Q) modulator in order to generate a real analog RF signal at an interpolated sampling rate.

Another aspect of the present invention is directed to a method of passband digital modulation for a data transmission system wherein a plurality of data symbols is transmitted over a transmission channel at a symbol rate. In one embodiment, the method of passband digital modulation comprises the following steps: (1) generating a plurality of I and Q components of symbols by mapping an input bit stream comprising a plurality of digital codewords into a QAM constellation; (2) bandlimiting, quantizing, and interpolating the plurality of symbols by utilizing a Polyphase filter in each I and Q channels separately at a passband IF frequency; (3) pre-compensating the inphase (I) and the quadrature (Q) components of the digital signal having the IF carrier signal for a sync (sin x/x) function amplitude roll off caused by an output D/A converter by using a complex shaping filter; (4) upconverting the inphase (I) and the quadrature (Q) components of the digital signal to a RF carrier via a digital complex multiplier and discarding the Q output component of the digital signal; (5) converting the I output component into an analog RF output signal using the output D/A converter; and (6) filtering out images of the real output RF analog signal by using a lowpass analog reconstruction filter.

In one embodiment, the step of interpolating the plurality of symbols by utilizing the Polyphase filter in each I and Q channels separately is done at a sampling rate twice the symbol rate. In an alternative embodiment, the interpolating is done at a sampling rate four times the symbol rate.

One additional aspect of the present invention is directed to a method of baseband/passband digital modulation for a data transmission system wherein a plurality of data symbols is transmitted over a transmission channel at a symbol rate. In one embodiment, the method of baseband/passband digital modulation comprises the following steps: (1) generating a plurality of I and Q components of symbols by mapping an input bit stream comprising a plurality of digital codewords into a QAM constellation; (2) bandlimiting, quantizing, interpolating, the plurality of the symbols by utilizing a Polyphase filter in each the I and Q channels separately at a baseband/passband frequency; (3) selecting a passband or a baseband mode; and (4) generating an analog output signal in the passband or baseband mode. In the preferred embodiment of the present invention, the step of selecting the passband or the baseband mode depends on complexity of the QAM constellation. More specifically, if the QAM constellation includes more than 64 QAM plant points, the baseband mode is selected. If, on the other hand, the QAM constellation includes less than 64 QAM plant points, the passband mode is selected.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 depicts a prior art 4-fold interpolator which increases the sampling rate by a factor of four, that is $f_S'=4f_S$.

FIG. 2 is a prior art diagram that illustrates the prefiltering and sampling of analog signal.

FIG. 3 illustrates that spectral images of analog signal generated by the prior art sampling process at integral multiples of $f_S$ do not overlap, as required by the sampling theorem.

FIG. 4 depicts a prior art electronic path for analog reconstruction of sampled digital signal, including a D/A staircase reconstructor and analog anti-image lowpass post-filter with effective cutoff frequency $f_c \leq f_S/2$.

FIG. 5 shows a prior art ideal reconstructor as a lowpass filter (LPF) with the cutoff Nyquist frequency $f_S/2$ that completely removes spectral images due to sampling.

FIG. 6 depicts the spectrum of signal resampled at high rate $4f_S$ in which the spectral images are more widely separated than in the spectrum of signal resampled at rate $f_S$.

FIG. 7 illustrates the spectrum of low-rate samples with respect to high rate $4f_S$.

FIG. 8A shows an effect of a prior art high rate FIR interpolator on the spectrum of the low-pass rate samples (in digital frequency domain $\omega'=2\pi f/f'_S$).

FIG. 8B illustrates a prior art high-rate FIR interpolator that removes intermediate spectral images (in physical frequency domain $f'_S$).

FIG. 9 shows the prior art overall system that uses a 4-times oversampling digital filter to help analog reconstruction of the digital signal.

FIG. 10 depicts the QAM digital modulator circuitry of the present invention in the baseband mode.

FIGS. 11A–11D illustrate the effect of sin x/x pre-compensation introduced by the Polyphase filter on the spectrum of the signal propagating through the baseband circuitry of FIG. 10 in order to pre-compensate for the D/A converter in I and Q channels and to output the analog signal having a square shape.

FIG. 12 depicts the Polyphase filter in direct form comprising the first $FIR_1$ filter including N branches configured to implement the interpolating function at a sampling rate eight times the symbol rate, and the second $FIR_2$ filter including M branches configured to configured to implement the interpolating function at a sampling rate eight times the symbol rate; N and M are integers.

FIG. 13 shows the Polyphase filter implemented in a polyphase form with a regular clock rate.

FIG. 14 illustrates the Polyphase filter in the polyphase form implementing the interpolation function at a sampling rate eight times the symbol rate including the clock run at a double speed as compared with a conventional clock.

FIG. 15 illustrates the predistorter structure including block of shifted sum of squares, and including block of shifted complex multiply.

FIG. 16 depicts the QAM digital modulator circuitry of the present invention in the passband mode.

FIGS. 19A–19E illustrates how the spectrum is equalized for the D/A converter (sin x/x) function amplitude roll off by using the D/A compensation shaping filter.

FIG. 20 depicts the D/A compensation shaping filter that is used in the passband mode of the QAM digital modulator of the present invention to equalize for the D/A converter (sin x/x) function amplitude roll off.

FIG. 21 shows the DC offset block.

FIG. 22 illustrates the $F_S/4$ upconverter.

FIG. 23 is a flowchart of a method of baseband/passband digital modulation of the present invention using the QAM digital modulator circuitry of FIG. 10 and/or FIG. 16.

FIG. 24 is a flow chart of the method of the present invention that illustrates how the passband and/or baseband mode of operation is selected.

DETAILED DESCRIPTION OF THE PREFERRED AND ALTERNATIVE EMBODIMENTS

Figure 17:
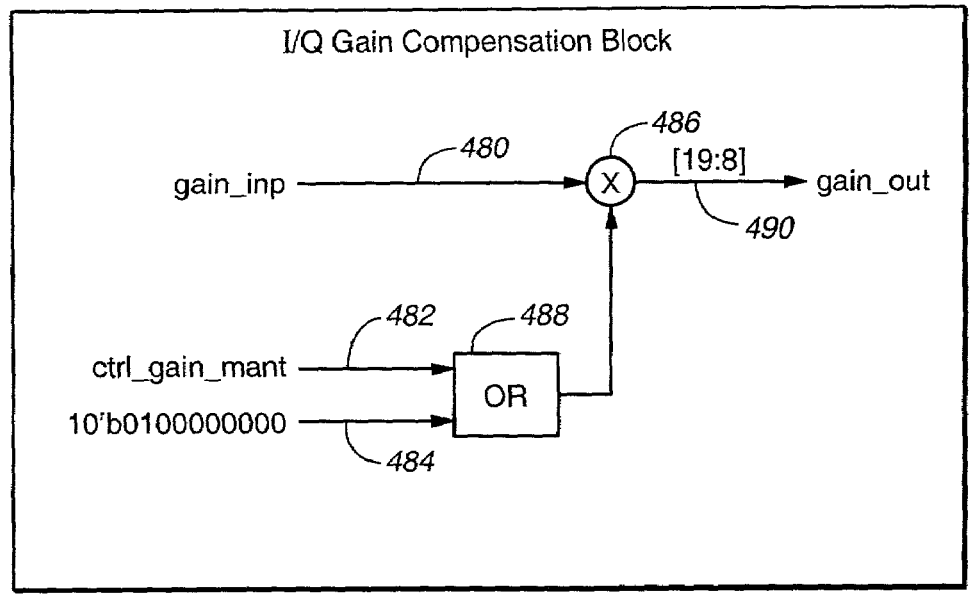
FIG. 17 shows the I/Q gain compensation block of the QAM digital modulator of the present invention in the passband mode that compensates for I/Q gain imbalances due to the tolerances of analog components within the I/Q part of the QAM modulator.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention incorporates and widely employs the prior art sampling interpolation technique that is extensively covered in the book "*Introduction to Signal Processing*", Chapter 12, by Sophocles J. Orfanidis, published by Prentice-Hall, Inc., in 1996. The following discussion is partly based on the above referenced book.

Sampling rate changes are useful in many applications, such as interconnecting digital processing systems operating at different rates. Sampling rate increase is accomplished by interpolation, that is the process of inserting additional samples between the original low-rate samples. The inserted, or interpolated, samples are calculated by a finite-impulse response (FIR) filter. This is illustrated in the prior art diagram 10 of FIG. 1 for a case of a 4-fold interpolator which increases the sampling rate by a factor of four, that is $f_S'=4f_S$. The 4-fold rate expander or unsampler 14 inserts three zero samples for every low-rate sample. Thus, the low-rate samples may be thought of as being separated by three zero samples, as shown in sampling diagram 16 of FIG. 1. The FIR interpolation filter 18 replaces the three zeros by the calculated interpolated values. as depicted in diagram 20 of FIG. 1. The interpolating FIR filter 18 is called an oversampling digital filter because it operates at the fast rate of $4f_S$. However, the FIR filtering operations can be rearranged in such a way as to operate only on the low-rate samples because only one out of every four input samples is non-zero. The computational requirements of the high-rate interpolating FIR filter 18 can be reduced by a factor of four by replacing the high-rate interpolating FIR filter by four shorter FIR subfilters, known as Polyphase filters operating at the low rate $f_S$. The length of the each FIR subfilter is one-quarter that of the original filter, and each subfilter is dedicated to computing only one of the four outputs. Such realization is computationally efficient and leads to parallel multiprocessor implementation in which a different DSP chip may be used to implement each subfilter.

One application of these ideas is the use of oversampling digital filters in CD or DAT players, where they help to alleviate the need for high-quality analog anti-image post-filters in the playback system. In addition, each high-rate sample can be requantized without loss of quality to fewer number of bits (as low as 1 bit per sample) using appropriate noisy shaping quantizers. This allows one to trade off bits for samples and simplify the structure of the analog part of the playback system.

FIG. 2 is a prior art diagram 30 that illustrates the prefiltering and sampling of analog signal 32. The lowpass antialiasing prefilter 34 having cutoff frequency $f_c \leq f_S/2$ prefilters the analog signal 32, wherein A/D converter 38 samples the bandlimited analog signal 36 at rate $f_S$ and further quantizes the sampled bandlimited analog signal to convert it to the digital signal at rate $f_S$ 40. FIG. 3 illustrates that spectral images 54 of analog signal generated by the sampling process at integral multiples of $f_S$ do not overlap, as required by the sampling theorem.

After digital processing, the digital sampled signal at rate $f_S$ 62 is reconstructed back to analog form by D/A staircase reconstructor 64 as shown in the prior art block diagram 60 of FIG. 4. The D/A converter 64 with its typical (sin x/x) response removes the spectral images partially. The staircase analog signal 66 is postfiltered by analog anti-image lowpass postfilter 68 with effective cutoff frequency $f_c \leq f_S/2$. The analog anti-image lowpass postfilter 68 completes the removal of the spectral images of the digital signal.

As shown in FIG. 5, the prior art ideal reconstructor 68 (of FIG. 4) is a lowpass filter (LPF) with the cutoff Nyquist frequency $f_S/2$ that completely removes spectral images due to sampling. The ideal reconstructor has a very sharp transition between its passband (Nyquist interval 86) and its stopband 88. To maintain high quality in the resulting reconstructed analog signal (66 of FIG. 4), a very high quality analog postfilter 68 is required. One way to alleviate the need for a high quality postfilter which may be expensive is to increase the sampling rate.

Indeed, as depicted in FIG. 6, in the spectrum of signal resampled at high rate $4f_S$ the spectral images 94, 92, 96 are more widely separated. If this is the case, the passband of the postfilter (Nyquist interval 98) extends up to $f_S/2$, but its stopband needs to begin only at $f_{stop} = f_S' - f_S/8 = 7f_S/8$. Thus, a less stringent and simpler low pass postfilter (68 of FIG. 4) can be used. However, the above given approach is impractical because it requires the actual resampling of the analog signal at the higher rate of $f_{S'}$. Indeed, for example, in CD player the low rate samples are already stored at the prescribed rate of 44.1 kHz and the audio signal cannot be resampled.

The oversampling of the digital signal allows one to avoid the resampling of the analog signal. In this approach, the sampling rate is increased digitally using an interpolation filter which operates only on the available low-rate input samples. The spectrum 110 of low-rate samples with respect to the high rate $4f_S$ is shown in FIG. 7. The spectrum 110 is also a spectrum of a high-rate unsampled signal at the output of the rate expander or unsampler 14 of FIG. 1. A digital lowpass FIR interpolator filter with cutoff frequency $f_S/8$ and operating at the high rate $f_S'$ would eliminate the three spectral replicas (112 of FIG. 7) that lie between replicas at multiples of $f_S'$, resulting in a spectrum that is identical to the spectrum (90 of FIG. 6) of a signal sampled at the high rate $f_S'$. The effect of such a digital filter on the spectrum of the low-pass rate samples is shown in FIG. 8B (with respect to the physical frequency $f_S'$) and in FIG. 8A (with respect to the corresponding digital frequency $\omega' = 2\pi f/f_S'$).

The overall prior art system 140 that includes a 4-times oversampling digital filter is depicted in FIG. 9. The system 140 demonstrates how to accomplish a substantial part of the analog reconstruction process by DSP methods. More specifically, the system 140 uses a digital oversampling filter 144 to remove several adjacent spectral replicas and thereby easing the requirements of the analog postfilter 148. The required sharp transition characteristics of the overall reconstructor are provided by the digital filter 144. Thus, the high-quality analog postfilter 148 is traded off for a high-quality digital filter 144 operating at a higher sampling rate.

FIG. 10 depicts the QAM digital modulator circuitry 160 of the present invention that operates in the baseband mode. The QAM digital modulator of the present invention in the passband mode of operation is discussed below. The QAM digital modulator circuitry of the present invention accepts up to 10-bit I and Q symbols and provides 12-bit outputs to the modulator D/A converters. The QAM digital modulator is capable of providing I and Q outputs for a baseband IQ analog up conversion or passband samples for a passband to IF up conversion.

In the baseband mode of operation, the carrier frequency is zero. An inphase (I) component 168 and a quadrature (Q) component 166 of digital symbols are created by mapping the input bit stream 162 of data symbols at a symbol rate into a selected QAM constellation 161 in the MAP block 164. The mapping process that maps the input information bits 162 from the digital source (not shown) onto the in-phase (I) and quadrature (Q) carriers determines the properties of the modem.

The QAM constellation comprises: a 4 QAM, a 16 QAM, a 32 QAM, a 64 QAM, a 128 QAM, a 256 QAM constellation, and so on. For each given digital signal processing (DSP) application, the preferable QAM constellation is selected by the designer of the DSP application.

For example, in a 16-QAM square constellation (not shown) each element (phasor) is represented by a four-bit symbol comprising the in-phase bits (i1, i2) and quadrature bits (q1, q2) which are interleaved to yield the sequence (i1, q1, i2, q2). To maximize the average energy of the phasors, quaternary quadrature components I and Q are Gray encoded by assigning the bits 01, 00, 10, and 11 to the levels 3d, d, −d, and −3d, respectively. For any other phasor arrangement the average energy will be less and the signal to noise ratio (SNR) required to achieve the same bit error rate (BER) will be higher.

Due to the instantaneous transitions in the time domain the I-sequence has an infinite bandwidth and would require an infinite channel bandwidth for its transmission. The same is true for the Q-component. Thus, the I and Q signals should be bandlimited before transmission in order to contain the spectrum within a limited band and to minimize interference with other users or systems sharing the spectrum.

Referring still to FIG. 10, the bandlimiting, quantizing, and interpolating operations are performed by a Polyphase filter 170 on both I channel and Q channels. In the baseband mode of operation the Polyphase filter 170 operates at the baseband frequency. Thus, a Polyphase filter combines an ideal linear-phase low pass Nyquist filter configured to perform the bandlimiting operation, an interpolator configured to perform the interpolation operation, and a sin x/x digital-to analog (D/A) compensation. An ideal linear-phase low pass filter with a cut-off Nyquist frequency of $f_N = f_S/2$, wherein $f_S = 1/T$ is the signaling frequence, and wherein T is the signaling interval duration, would retain all the information conveyed by the inphase and quadrature components I and Q within a compact frequence band. Due to the linear phase response of the filter all frequency components would exhibit the same group delay. Because such a filter has a root-raised cosin function shaped impulse response with equi-distant zero-crossings at the sampling instants, it does not result in inter-symbol-interference (ISI).

According to Nyquist's fundamental theorem, the sampling frequency should be equal to or higher than twice the bandwidth B, that is:

$$f_c \geq 2B. \quad (1)$$

If this condition is met, the original bandlimited signal can be recovered from its (½B)-spaced sampled representation with the aid of a low-pass filter having a cut-off frequency of B. For instance, applying the Nyquist's fundamental theorem to the audio signals, one can see that because the most of the energy of a voice signal is concentrated at frequencies below 4 kHz, and hence speech signals are typically lowpass filtered to 4 kHz, the audio carrier frequency (or the audio sampling rate) should be of:

$$f_c^{audio} \geq 2B_{audio} \geq 8 \text{ kHz} \quad (2)$$

in order to accurately reconstruct such a signal. In practice, most voice communication systems use a sampling rate of 8 kHz.

Similarly applying the Nyquist's fundamental theorem to the video signals transmitted over the wired communication channel with the bandwidth of $B_{video}$=200 MHz, the video carrier (or the video-sampling) frequency $f_c^{video}$ should be equal to or higher than twice the video bandwidth $B_{video}$, that is:

$$f_c^{video} \geq 2B_{video} = 400 \text{ MHz}. \quad (3)$$

The required sampling rate for transition from an audio mode of communication (at 8 kHz for audio signals), to a wired video mode (at 400 MHz for wired video signals) is significantly increased in order to accommodate for the significantly increased amount of data required to be transmitted per second for the video mode of communication. as compared with amount of data required to be transmitted per second for the audio mode of communication.

One way to significantly increase the output sampling rate without changing the input sampling rate is to use the interpolator as was fully discussed above. More specifically, the computational requirements of the high-rate interpolating FIR filter can be reduced by a factor of N by replacing the high-rate interpolating FIR filter by N shorter FIR subfilters, known as Polyphase filters operating at the low rate $f_S$. The length of the each FIR subfilter is (1/N) that of the original filter, and each subfilter is dedicated to computing only one of the N outputs. Such realization is computationally efficient and leads to parallel multiprocessor implementation in which a different DSP chip may be used to implement each subfilter.

Referring still to FIG. 10, in one embodiment of the present invention, the interpolating function of the Polyphase filter 170 is implemented by using a finite impulse response (FIR). In one embodiment of the present invention, the interpolation function is realized by utilizing the Polyphase filter 170 interpolating at a sampling rate twice the symbol rate in both I and Q channels at baseband frequency. In another embodiment of the present invention, the interpolation function is realized by utilizing the Polyphase filter 170 interpolating at a sampling rate four times the symbol rate in both I and Q channels at baseband frequency. In one additional embodiment of the present invention, the interpolation function is realized by utilizing the Polyphase filter 170 interpolating at a sampling rate eight times the symbol rate in both I and Q channels at baseband frequency.

FIGS. 11A–11D illustrate the effect of sin x/x pre-compensation introduced by the Polyphase filter 170 on the spectrum of the signal propagating through the circuitry 160 of FIG. 10 in order to pre-compensate for the D/A converter 184 in I channel and 186 in Q channel and to output the analog signal having a square shape. If there is no pre-compensation, that is the spectrum of the signal after the Polyphase filter 170 (of FIG. 10) has shape 202 of FIG. 11A, after the D/A converters 184 and 182 the spectrum has shape 204 as depicted in FIG. 1B, which is not rectangular. The additional spectrums 208 and 210 that appear after D/A converters (amplitude of which decays corresponding to sin x/x function) are removed by using Lowpass Filters 188 and 186 in channels I and Q respectively, as shown in FIG. 11C. Finally, the spectrum 204 having rectangular shape is upconverted to the RF sampling frequency divided by the interpolation rate $F_S$/(I-rate). In the preferred embodiment, I-rate is equal to four. See discussion below.

In one embodiment of the baseband mode of the present invention, the Polyphase filter 170 (of FIG. 10) is implemented in direct form 240 as depicted in FIG. 12. The Polyphase filter 240 comprises the first $FIR_1$ filter 241 including N branches (244–258) configured to interpolate at a sampling rate eight times the symbol rate in each I and Q channels separately at baseband frequency, and the second $FIR_2$ filter 280 including M branches (286–299) also configured to interpolate at a sampling rate eight times the symbol rate in each I and Q channels separately at baseband frequency. In one embodiment, the Polyphase filter comprises a single FIR filter including (N+M) branches (not shown) configured to implement the interpolating function at a sampling rate eight times the symbol rate. N and M are integers.

In one additional embodiment of the present invention, the Polyphase filter in direct form interpolates at a sampling rate N times the symbol rate in each I and Q channels separately at baseband frequency (not shown), wherein N is an integer.

In this embodiment, the Polyphase filter comprises the first $FIR_1$ filter including N branches (not shown) configured to implement the interpolating function at a sampling rate N times the symbol rate, and the second $FIR_2$ filter including M branches (not shown) configured to implement the interpolating function at a sampling rate N times the symbol rate. In one embodiment, the Polyphase filter comprises a single FIR filter including (N+M) branches (not shown) configured to implement the interpolating function at a sampling rate N times the symbol rate.

As shown in FIG. 13, in one embodiment of the present invention in the baseband mode, the Polyphase filter 170 is implemented in a poly-phase form 300. The Polyphase filter 170 in a poly-phase form 300 includes at least one polycell 302 including a set of four coefficients $C_1$ 306, $C_2$ 307, $C_3$ 309, and $C_4$ 311, and four outputs 332, 334, 336, and 338 in order to implement the interpolating function at a sampling rate four times the symbol rate. In the polyphase embodiment of the Polyphase filter 300 (of FIG. 13) the original clock rate is preserved, whereas in the direct form the clock rate is substituted by the interpolation rate. Thus, the Polyphase filter 170 in a poly-phase form 300 allows one to implement an interpolator having a higher rate in a poly-phase form 300, as opposed to the Polyphase filter 170 in a direct form, and without increasing the clock rate.

In another embodiment of the present invention, the Polyphase filter in a polyphase form (not shown) includes at least two polycells like polycell 302 of FIG. 13, each of which includes four coefficients, that is the Polyphase filter includes altogether a set of eight coefficients C (not shown) and eight outputs (not shown) in order to implement the interpolating function at a sampling rate eight times the symbol rate. In this embodiment, the original clock rate is also preserved.

In one embodiment of the present invention, as illustrated in FIG. 14, the Polyphase filter in a polyphase form implementing the interpolation function at a sampling rate eight times the symbol rate includes the clock that is run at a double speed as compared with a conventional clock. To double the symbol rate the stream of symbols 352 is held for two clocks before input is performed. This allows the designer to decrease the number of multipliers up to four still keeping the interpolating rate at eight. The output signals are generated at odd times and at even times in different pathways 364 and 362 (accordingly).

Pre-compensation is one of the best of the many methods of nonlinear compensation. Using this technique, as shown in FIG. 10, inverse distortion is added to the predistortion block 174 for odd samples and the predistortion block 176 for even samples in order to cancel the non-linear distortions due to the non-linear power amplifier (NPA) in the output signal. The traveling wave tube (TWT) amplifier is the most popular non-linear power amplifier (NPA) used for the microwave power amplification purposes. The TWT is used primarily in high power amplifiers and for high capacity digital transmissions. The nonlinear characteristics of TWT amplifiers cause problems, as a pulse shape distortion results in the diminution of performance. Indeed, even if an original modulation signal is band limited, inter modulation results in an out-of-band power leakage. The out-of-band power leakage causes an increase in inter symbol interference due to a receiver band-limiting effect. The out-of-band power leakage also causes interference in adjacent channels which cannot be completely eliminated by RF transmitter bandpass filtering. Thus, without nonlinear compensation, efficient high capacity digital transmission cannot be achieved without operation at large power back off. The non-linear distortions of the NPA varies with the outside temperature, humidity, amplifier parameters aging, etc. Therefore, the operation point of the NPA has to be adjusted to compensate for those changes in those parameters that are external to the non-linear transmission circuit.

A TWT power amplifier typically introducers the third-order distortion T from a complex input signal $X_i$:

$$T = X_i |X_i|^2; \quad (4)$$

and a complex coefficient $\acute{\eta}$ is generated by a phase shifter and an attenuator as follows:

$$\acute{\eta} = \alpha \cdot e^{j\phi}. \quad (5)$$

An inverse third-order distortion component d is composed of T and $\acute{\eta}$ as follows:

$$d = \acute{\eta} \cdot T = \acute{\eta} \cdot X_i |X_i|^2. \quad (6)$$

Consequently, the predistortion output $\acute{r}$ is expressed in the following equation:

$$\acute{r} = X_i + d = X_i + \acute{\eta} \cdot X_i |X_i|^2. \quad (7)$$

An optimum $\acute{\eta}$ should be determined so as to effectively cancel TWT third-order distortion. Assuming that the nonlinearities of both TWT and the predistorter have no memories in a compensation algorithm, as shown in FIG. 10, the predistortion block 174 for odd samples, and the predistortion block 176 for even samples are placed before the TWT (not shown).

In one embodiment of the present invention, FIG. 15 illustrates the predistorter structure 380, wherein the block 1 382 including the shifted sum of squares represents the $|X_i|^2$ element in Eq. (7), wherein block 2 384 including the shifted complex multiply represents the element $\acute{\eta} \cdot X_i |X_i|^2$ in Eq. (7), and wherein the predistortion output signal 386 represents the output r according to Eq. (7). Thus, predistorter 380 compensates for the third order nonlinearities caused by the operation of the non-linear region of the nonlinear power amplifier (NPA). The usage of the predistorter allows operation at a greater power level.

Referring still to FIG. 10, the D/A converter 184 in channel I (and 182 in channel Q) converts the plurality of digital symbols into an analog signal 185 (and 183 accordingly). The D/A converter introduces a plurality of spectrums 204, 206, and 208 as depicted in FIG. 11B. The next prefiltering operation is performed by a lowpass analog antialiasing prefilter 188 in the I channel, and by a lowpass analog antialiasing prefilter 186 in the Q channel separately. As shown in FIG. 11C, the spectrums 210 and 208 are removed after the prefiltering operation. In the baseband mode of the present invention the digital signals are converted back to the analog form before complexly combining I and Q components of the analog signal in the I/Q combiner/modulator 190 and before generating a real analog RF signal 194 at an interpolated sampling rate. This is due to the fact that the carrier frequency in the baseband mode is zero, and the digital-to-analog conversion is necessary in order the circuitry could output the real analog RF signal 194. If the predistorters 174 and 176 are used, the final spectrum of the RF analog signal after upconversion to RF frequency has a square form as shown in FIG. 11D.

The advantages of the QAM digital modulator that operates in the baseband mode over the QAM digital modulator that operates in the passband mode are as follows: (i) it is easier to convert the analog signal from zero carrier frequency to RF signal; (ii) the D/A converters 182 (and 184) operate at half speed of passband implementation (please, see discussion below).

The drawbacks of the baseband approach are as follows: (i) the I/Q combiner 190 generally introduces the I/Q amplitude and phase imbalances and DC offset; (ii) the QAM digital modulator in the baseband implementation needs periodic re-calibrating for an analog drift of the I/Q amplitude imbalance, for an analog drift of the I/Q phase imbalance, and for an analog drift of the DC offset caused by changes in outside temperature, and caused by aging of electronic components; (iii) the baseband mode circuitry employs two D/A converters instead of one D/A in the passband mode.

In one embodiment of the present invention, FIG. 16 depicts the QAM digital modulator circuitry 400 in the passband mode. The MAP block 404 is identical to the MAP block 164 of FIG. 10 and is configured to map an input bit stream 402 comprising a plurality of digital codewords into a QAM constellation 406 in order to generate a plurality of I component of symbols 408 in the I channel and a plurality of Q components of symbols 410 in the Q channel. The Polyphase filter 412 in the passband mode is identical to the Polyphase filter 170 in the baseband mode. The only difference is that the pre-compensation function to accommodate for a sync (sin x/x) function roll off caused by an output D/A converter 438 is performed by the complex shaping filter 430 (see discussion below. Thus, the Polyphase filter 412 performs the bandlimiting, quantizing, and interpolating operations over the plurality of symbols in I and Q channels separately at a passband IF frequency.

In the passband mode circuitry 400 (of FIG. 16) of the present invention the carrier is IF frequency if the interpolation is done at four times the symbol rate. On the other hand, if the interpolation is done at eight times the symbol rate, the carrier frequency is equal to twice the IF frequency.

The pre-distortion blocks 420 for odd samples and 422 for even samples are identical to the corresponding blocks 174 and 176 in the baseband mode and perform identical functions, that is the inverse distortion is added to the predistortion blocks 420 for odd samples and the predistortion block 422 for even samples in order to cancel the non-linear distortions due to the non-linear power amplifier (NPA) in the output signal 442.

Figure 18:
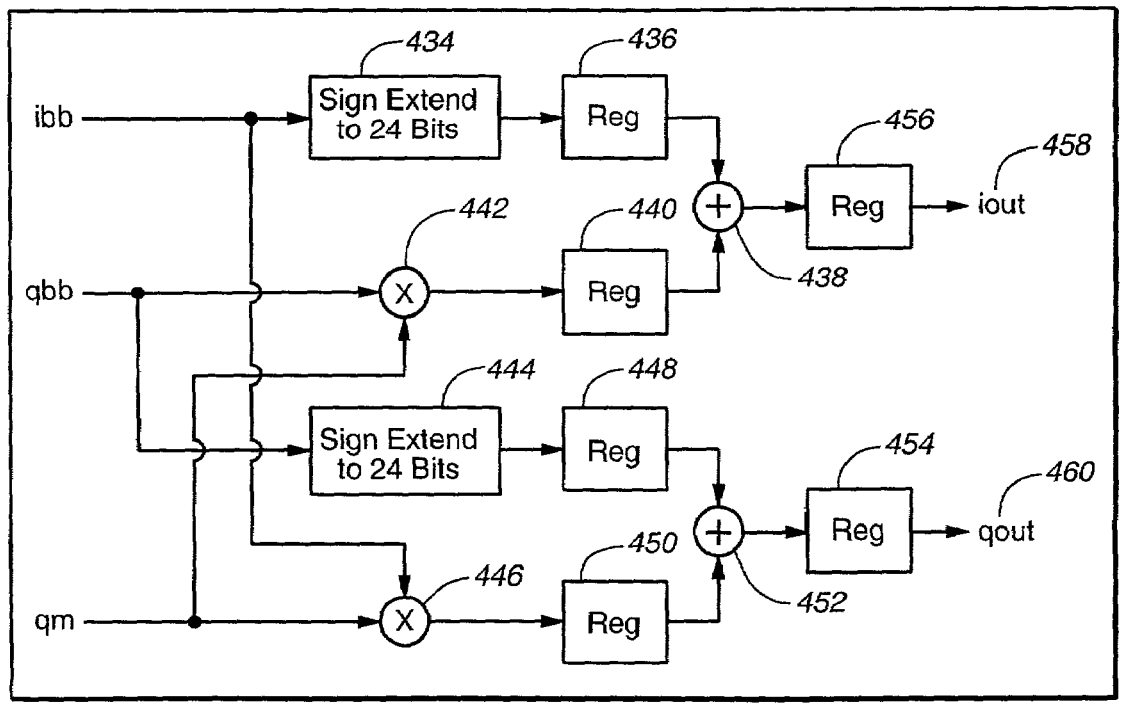
FIG. 18 illustrates the structure of the quadrature error compensation block (Quad Error block) of FIG. 16 that removes the I/Q phase errors due to the tolerances of analog components within the analog I/Q part of the QAM modulator.

In one embodiment of the present invention, FIG. 17 depicts an I/Q gain compensation block 426 of the QAM digital modulator in the passband mode that compensates for I/Q gain imbalances that occur due to the tolerances of analog components within the QAM modulator. Either I or Q components can be scaled to cancel the effects of the analog modulator. On the other hand, FIG. 18 depicts the structure of the Quadrature error compensation block 432 (of FIG. 16) that is configured to remove the I/Q phase errors due to the tolerances of analog components within the analog I/Q part of the QAM modulator. The sign of the I and Q components of the digital signals is extended up to 24 bits in order to improve the performance of the QAM modulator.

A complex shaping filter 430 (of FIG. 16) is used to pre-compensate the I and Q components of the digital signal having the IF carrier signal for a sync (sin x/x) function amplitude roll off caused by an output D/A converter 438. FIGS. 19A–19E illustrate how the spectrum is precompensated for the DAC (sin x/x) function amplitude roll off. More specifically, the D/A compensation shaping filter 430 is used to equalize the sin(x)/x effects in the passband mode of operation. Indeed, as shown in FIG. 19B, the spectrum 466 has an additional elevation of the right hand side after shaper 430. After up-conversion the spectrum shifts up in frequency by $F_S/4$ without changing in shape. The resulting spectrum 476 has a perfect rectangular form as depicted in FIG. 19E because the sin(x)/x effects in the passband mode of operation is equalized by the D/A compensation shaping filter 430, and because the LPF filter 440 removes the additional components 474 of the spectrum from the output signal. See discussion below. Since only every other output of the I and Q phases are required by the $F_S/4$ upconverter, the D/A compensation shaping filter 430 reduces to the following circuitry as depicted in FIG. 20.

The DC offset block 434 is illustrated in FIG. 21. The DC offset compensation is provided to compensate for either I or Q leakage from the LO. The DC offset should be calibrated and programmed into the registers 502 and 504. The sign is extended up to 12 bits, as indicated in blocks 498 and 500 of FIG. 21.

Referring still to FIG. 16, the upconverter block 436 upconverts the signal to a RF carrier frequency via a digital complex multiplier and discards the Q output component 437 of the digital signal. As shown in FIG. 22, the upconverter block 436 is implemented as an $F_S/4$ upconverter. This requires only even time I samples and odd time Q samples. Each I and Q sample is multiplied by the repeating sequence +1, −1, +1, −1, . . . that represents the 0, 90, 180, and 270 degree angels from a digital LO.

After near perfect upconversion, we do not need both I and Q components of the digital signal. We can use only one, either I or Q components as the real RF output signal. So, after selecting the I components 435 of the digital signal, it is converted into an analog RF output signal using the output D/A converter 438. Finally, the LPF filter 440 (a lowpass analog reconstruction filter) filters out images of the real output RF analog signal, as shown in FIG. 19E.

Thus, the QAM modulator of the present invention in the passband mode of operation has a number of advantages: (i) a near perfect upconversion; (ii) no I/Q amplitude imbalances; (iii) no I/Q phase errors; (iv) no DC offsets; (v) uses only one D/A converter. The disadvantages of the passband mode operation are as follows: (i) D/A converter should be sampled at twice rate as compared with the D/A converter in the baseband mode of implementation; (ii) a more difficult analog filtering circuitry.

The present invention can be practiced in both baseband and/or passband mode depending on a number of factors. The mode of operation can be also dynamically altered, as described below.

One aspect of the present invention, as shown in a flowchart 540 of FIG. 23, is directed to a method of baseband/passband digital modulation for a data transmission system wherein a plurality of data symbols is transmitted over a transmission channel at a symbol rate. In one embodiment of the present invention, the method comprises the following steps. After a plurality of I and Q components of symbols is generated by mapping an input bit stream comprising a plurality of digital codewords into a QAM constellation (step 544), a Polyphase filter is used to perform bandlimiting, quantizing, and interpolating operation on the plurality of the symbols at a baseband/passband frequency (step 546). At the next step (step 548) the decision is made (see discussion below) whether to select a passband or baseband mode of operation. This decision is based on complexity of the QAM constellation. And finally (step 550), an analog output signal is generated in the passband or baseband mode.

FIG. 24 is a flow chart of the method of the present invention that illustrates how the passband and or baseband mode of operation is selected. At step 564, the initial selection is made based on the complexity of the QAM constellation. More specifically, if the test condition 566 is satisfied, that is:

if the QAM constellation includes less than 64 QAM plant points?

the passband mode is initially selected, that is the flow chart follow the logical arrow 572. If the QAM constellation includes more than 64 QAM plant points, that is the test condition 566 fails, the baseband mode is initially selected. The flow chart follows the logical arrow 570 and the step 564 is repeated until the test condition 566 is satisfied.

If the test condition 576 is satisfied, that is:
  (i) if a D/A conversion speed reaches a maximum passband conversion speed; and
  (ii) if an output symbol rate reaches a maximum passband symbol output rate;

the flow chart 560 follows the logical arrow 580, and the step 582 is performed: the QAM modulator subsequently switches to the baseband mode in order to double the maximum passband conversion speed and to double the maximum passband symbol output rate. If test 5786 fails, the flow chart follows the logical arrow 578 to the end condition 584.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of baseband digital modulation for a data transmission system wherein a plurality of data symbols is transmitted over a transmission channel at a symbol rate; said method comprising the steps of:

generating a plurality of inphase (I) and quadrature (Q) components of symbols by mapping an input bit stream comprising a plurality of digital codewords into a QAM constellation;

bandlimiting, quantizing, interpolating, and pre-compensating said I and Q components a digital signal for a sinc (sin x/x) function amplitude roll off by utilizing a Polyphase filter at a baseband frequency;

converting a plurality of digital symbols into an analog signal by using a D/A converter in each I and Q channels separately;

prefiltering by a lowpass analog antialiasing prefilter an I analog signal in an I channel, and an Q analog signal in a Q channel separately; and complexly combining said I component and said Q component of said analog signal by an (I/Q) modulator to generate a real analog RF signal at an interpolated sampling rate.

2. The method of claim 1, wherein said step of bandlimiting, interpolating, and pre-compensating said plurality of said symbols by utilizing said Polyphase filter in each said I and Q channels separately at baseband frequency further includes the step of:

interpolating at a sampling rate twice the symbol rate.

3. The method of claim 1, wherein said step of bandlimiting, interpolating, and pre-compensating said plurality of said symbols by utilizing said Polyphase filter in each said I and Q channels separately at baseband frequency further includes the step of:

interpolating at a sampling rate four times the symbol rate.

4. The method of claim 1, wherein said step of bandlimiting, interpolating, and pre-compensating said plurality of said symbols by utilizing said Polyphase filter in each said I and Q channels separately at baseband frequency further includes the step of:

interpolating at a sampling rate eight times the symbol rate.

5. The method of claim 1, wherein said step of bandlimiting, interpolating, and pre-compensating said plurality of said symbols by utilizing said Polyphase filter in each said I and Q channels separately at baseband frequency further includes the step of:

interpolating at a sampling rate N times the symbol rate, wherein N is an integer.

6. The method of claim 1, wherein said step of bandlimiting, quantizing, interpolating, and pre-compensating said I and Q components of said digital signal for said sync (sin x/x) function amplitude roll off further includes the step of:

introducing a predistortion correction error signal in each said I and Q channels separately in order to pre-compensate for a further compression by a High Power Amplifier (HPA).

7. The method of claim 6 further including the step of:

periodically re-calibrating for an analog drift of said I/Q amplitude imbalance, for an analog drift of said I/Q phase imbalance, and for an analog drift of said DC offset caused by changes in outside temperature, and caused by aging of electronic components.

8. A method of passband digital modulation for a data transmission system wherein a plurality of data symbols is transmitted over a transmission channel at a symbol rate; said method comprising the steps of:

generating a plurality of I and Q components of symbols by mapping an input bit stream comprising a plurality of digital codewords into a QAM constellation;

bandlimiting, quantizing, and interpolating said plurality of symbols by utilizing a Polyphase filter at a passband IF frequency;

pre-compensating said I and Q components of a digital signal having an IF carrier signal for a sinc (sin x/x) function amplitude roll off caused by an output D/A converter by using a complex shaping filter;

upconverting said I and said Q components of the digital signal to a RF carrier via a digital complex multiplier and discarding a Q output component of said digital signal;

converting an I output component into an analog RF output signal using said output D/A converter; and filtering out images of a real output RF analog signal by using a lowpass analog reconstruction filter.

9. The method of claim 8, wherein said step of bandlimiting, quantizing, and interpolating said plurality of symbols at said passband IF frequency further includes the step of:

interpolating at a sampling rate four times the symbol rate, wherein said IF frequency is equal to a symbol rate frequency.

10. The method of claim 8, wherein said step of bandlimiting, quantizing, and interpolating said plurality of symbols at said passband IF frequency further includes the step of:

interpolating at a sampling rate eight times the symbol rate, wherein said IF frequency is twice a symbol rate frequency.

11. The method of claim 8, wherein said step of bandlimiting, quantizing, and interpolating said plurality of symbols at said passband IF frequency further includes the step of:

interpolating at a sampling rate equal to N times the symbol rate, wherein said IF frequency is equal to N/2 times a symbol rate frequency, wherein N is an integer.

12. The method of claim 8, wherein said step of bandlimiting, quantizing, and interpolating said plurality of symbols at said passband IF frequency further includes the step of:

introducing a predistortion correction error signal in each said I and Q channels separately in order to pre-compensate for a further compression by a High Power Amplifier (HPA).

13. The method of claim 8 further including the steps of:

compensating for I/Q amplitude imbalance by using an I/Q amplitude gain block in said I channel and by using an I/Q amplitude gain block in said Q channel;

compensating for I/Q phase imbalance by using a quadrature error complex multiplier in order to change a phase relationship between I and Q components; and compensating for a DC offset by adding an equal amount of opposite polarity DC offset in each said I and Q channels.

14. A method of baseband/passband digital modulation for a data transmission system wherein a plurality of data symbols is transmitted over a transmission channel at a symbol rate: said method comprising the steps of:

generating a plurality of I and Q components of symbols by mapping an input bit stream comprising a plurality of digital codewords into a QAM constellation;

if said QAM constellation includes less than 64 QAM plant points, initially selecting a passband mode until a D/A conversion speed reaches a maximum passband conversion speed, and until an output symbol rate reaches a maximum passband symbol output rate, and subsequently switching to a baseband mode in order to double said maximum passband conversion speed and to double said maximum passband symbol output rate; and generating an analog output signal in said passband or baseband mode.

15. A method of baseband/passband digital modulation for a data transmission system wherein a plurality of data symbols is transmitted over a transmission channel at a symbol rate; said method comprising the steps of:

generating a plurality of I and Q components of symbols by mapping an input bit stream comprising a plurality of digital codewords into a QAM constellation;

selecting a passband or a baseband mode; and generating an analog output signal in said passband or baseband mode; wherein if said baseband mode is selected, said step of generating said analog output signal further includes the steps of:

converting said plurality of digital symbols into an analog signal by using a D/A converter in each said I and Q channels separately;

prefiltering by a lowpass analog antialiasing prefilter each said analog signal in each said I and Q channels separately; and complexly combining said I component and said Q component of said analog signal to generate a real analog RF signal at an interpolated sampling rate.

16. The method of claim 15, wherein in said baseband mode said step of generating said analog output signal further includes the steps of:

complexly upconverting and combining said I and Q components of said digital signal to generate an analog RF signal at an interpolated sampling rate, and filtering out images of said real output RF analog signal by using a lowpass analog reconstruction filter.

17. A method of baseband/passband digital modulation for a data transmission system; wherein a plurality of data symbols is transmitted over a transmission channel at a symbol rate; said method comprising the steps of:

generating a plurality of I and Q components of symbols by mapping an input bit stream comprising a plurality of digital codewords into a QAM constellation;

selecting a passband or a baseband mode; and generating an analog output signal in said passband or baseband mode;

said step of selecting said passband mode or said passband mode further including the following steps:

bandlimiting, quantizing, and interpolating said plurality of symbols by utilizing a Polyphase filter in each said I and Q channels separately at a passband IF frequency;

introducing a predistortion correction error signal in each said I and Q channels separately in order to pre-compensate for a further compression by a High Power Amplifier (HPA);

pre-compensating said I and Q components of said digital signal having said IF carrier signal for a sync (sin x/x) function amplitude roll off caused by an output D/A converter by using a complex shaping filter;

upconverting said I and said Q components of the digital signal to a RF carrier via a digital complex multiplier and discarding said Q output component of said digital signal;

converting said I output component into an analog RF output signal using said output D/A converter; and filtering out images of said real output RF analog signal by using a lowpass analog reconstruction filter.

18. An apparatus for baseband digital modulation for a data transmission system wherein a plurality of data symbols is transmitted over a transmission channel at a symbol rate; said apparatus comprising:

a means for generating a plurality of inphase (I) and quadrature (Q) components of symbols by mapping an input bit stream comprising a plurality of digital codewords into a QAM constellation;

a means for bandlimiting, quantizing, interpolating, and pre-compensating said I and Q components of a digital signal for a sync (sin x/x) function amplitude roll off at a baseband frequency;

a means for converting a plurality of digital symbols into an analog signal;

a means for prefiltering an I analog signal in an I channel, and a Q analog signal in a Q channel separately; and a means for complexly combining said I component and said Q component of said analog signal to generate a real analog RF signal at an interpolated sampling rate.

19. The apparatus of claim 18, wherein said means for interpolating said I and Q components of said digital signal further includes:

a means for interpolating at a sampling rate four times the symbol rate.

20. The apparatus of claim 18, wherein said means for interpolating said I and Q components of said digital signal further includes:

a means for interpolating at a sampling rate eight times the symbol rate.

21. The apparatus of claim 18, wherein said means for interpolating said I and Q components of said digital signal further includes:

a means for interpolating at a sampling rate equal to N times the symbol rate, wherein N is an integer.

22. The apparatus of claim 18 further including:

a means for pre-compensating for a further compression by a High Power Amplifier (HPA).

23. The apparatus of claim 18 further including:

a means for periodically re-calibrating for an analog drift of said I/Q amplitude imbalance, for an analog drift of said I/Q phase imbalance, and for an analog drift of said DC offset caused by changes in outside temperature, and caused by aging of electronic components.

24. An apparatus for passband digital modulation for a data transmission system wherein a plurality of data symbols is transmitted over a transmission channel at a symbol rate; said apparatus comprising:

a means for generating a plurality of I and Q components of symbols by mapping an input bit stream comprising a plurality of digital codewords into a QAM constellation;

a means for bandlimiting, quantizing, and interpolating a plurality of symbols at a passband IF frequency;

a means for pre-compensating said I and Q components of a digital signal having an IF carrier signal for a sinc (sin x/x) function amplitude roll off;

a means for upconverting said I and said Q components of the digital signal to a RF carrier;

a means for converting said I output component into an analog RF output signal; and a means for filtering out images of a real output RF analog signal.

25. The apparatus of claim 24, wherein said means for interpolating said plurality of symbols at said passband IF frequency further includes:

a means for interpolating at a sampling rate four times the symbol rate, wherein said IF frequency is equal to a symbol rate frequency.

26. The apparatus of claim 24, wherein said means for interpolating said plurality of symbols at said passband IF frequency further includes:

a means for interpolating at a sampling rate eight times the symbol rate, wherein said IF frequency is twice a symbol rate frequency.

27. The apparatus of claim 24, wherein said means for interpolating said plurality of symbols at said passband IF frequency further includes:

a means for interpolating at a sampling rate N times the symbol rate, wherein said IF frequency is equal to N/2 symbol rate frequency, N being an integer.

28. The apparatus of claim 24 further including:

a means for introducing a predistortion correction error signal in each said I and Q channels separately in order to pre-compensate for a further compression by a High Power Amplifier (HPA).

29. An apparatus for baseband/passband digital modulation for a data transmission system wherein a plurality of data symbols is transmitted over a transmission channel at a symbol rate; said apparatus comprising:

a means for generating a plurality of I and Q components of symbols by mapping an input bit stream comprising a plurality of digital codewords into a QAM constellation;

a means for selecting a passband or a baseband mode; and a means for generating an analog output signal in said passband or baseband mode;

wherein said means for selecting said passband or said baseband mode further includes the following algorithm:

if said QAM constellation includes less than 64 QAM plant points, initially selecting said passband mode until a D/A conversion speed reaches a maximum passband conversion speed, and until an output symbol rate reaches a maximum passband symbol output rate, and subsequently switching to said baseband mode in order to double said maximum passband conversion speed and to double said maximum passband symbol output rate.

* * * * *